(12) United States Patent
Vilim et al.

(10) Patent No.: US 12,163,867 B1
(45) Date of Patent: Dec. 10, 2024

(54) PHYSICS-CONSTRAINED SENSOR ASSIGNMENT OPTIMIZATION METHOD FOR THERMAL HYDRAULIC SYSTEMS

(71) Applicant: UCHICAGO ARGONNE, LLC, Chicago, IL (US)

(72) Inventors: Richard B. Vilim, Sugar Grove, IL (US); Tat Nghia Nguyen, Willowbrook, IL (US); Haoyu Wang, Darien, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 304 days.

(21) Appl. No.: 17/136,673

(22) Filed: Dec. 29, 2020

(51) Int. Cl.
*G01M 99/00* (2011.01)
*G01F 1/86* (2006.01)
(Continued)

(52) U.S. Cl.
CPC .............. *G01M 99/00* (2013.01); *G01F 1/86* (2013.01); *G01F 23/804* (2022.01); *G05B 23/0283* (2013.01)

(58) Field of Classification Search
CPC ........ G01F 1/86; G01F 23/804; G01M 99/00; G05B 17/00; G05B 23/00; G05B 23/0283; G06Q 10/06; G06Q 10/063; G06Q 10/20
See application file for complete search history.

(56) References Cited

U.S. PATENT DOCUMENTS 6,356,857 B1 * 3/2002 Qin .................... G05B 23/0221
  702/185
8,571,904 B2 * 10/2013 Guru ...................... G06Q 10/06
  705/7.11
(Continued)

FOREIGN PATENT DOCUMENTS

WO  WO-2009048963 A1 * 4/2009 ........... G05B 13/048

OTHER PUBLICATIONS

Dimension. (2016). In Editors of the American Heritage Dictionaries (Ed.), The American Heritage (R) dictionary of the English language (6th ed.). Houghton Mifflin. Credo Reference: https://search.credoreference.com/content/entry/hmdictenglang/dimension/0?institutionId=743 (Year: 2016).*
(Continued)

*Primary Examiner* — Giovanni Astacio-Oquendo
*Assistant Examiner* — Martin Walter Braunlich
(74) *Attorney, Agent, or Firm* — MARSHALL, GERSTEIN & BORUN LLP

(57) ABSTRACT

A method for determining an optimal sensor set includes identifying a set of possible faults of a thermal hydraulic system and a set of diagnostic objectives. The method also includes obtaining descriptions of sensor sets, which includes: receiving a first description of a first sensor set, and generating, based on the first description, a second description of a second sensor set. The method further includes, for each sensor set: determining a diagnostic capability of the sensor set, and calculating a score of the particular sensor set based on the particular description and the diagnostic capability, wherein a score of a sensor set is increased by a monetary cost of the sensor set and decreased by the sensor set meeting a diagnostic objective. The method also includes identifying the optimal sensor set that has a lowest score of the sensor sets, and displaying an indication of the optimal sensor set.

19 Claims, 14 Drawing Sheets

(51) Int. Cl.
 *G01F 23/80* (2022.01)
 *G05B 23/02* (2006.01)

(56) References Cited

U.S. PATENT DOCUMENTS

| | | | | |
|---|---|---|---|---|
| 10,860,013 | B2* | 12/2020 | Dagnino | G01M 99/00 |
| 2009/0210081 | A1* | 8/2009 | Sustaeta | H04L 67/125 |
| | | | | 715/702 |
| 2013/0179128 | A1* | 7/2013 | Mazzaro | G05B 19/0423 |
| | | | | 703/2 |
| 2014/0163713 | A1* | 6/2014 | Ross | G06Q 10/067 |
| | | | | 700/108 |

OTHER PUBLICATIONS

R.M. Singer, K. Gross, J.P. Herzog and S. Wegerich, "Power Plant Surveillance and Fault Detection: Applications to a Commercial PWR," *International Atomic Energy Agency (IAEA) Technical Committee Meeting*, Argonne, IL, Sep. 1997.

D.L. Inverson, "Inductive Health Monitoring System," *Proceedings of the 2004 International Conference on Artificial Intelligence (IC-A/'04)*, CSREA Press, Las Vegas, NV, Jun. 2004.

R. Vilim, A. Grelle, R. Lew, T. Ulrich, R. Boring and K. Thomas, "Computerized Operator Support System and Human Performance in the Control Room," *NPIC&HMIT*, San Francisco, CA, Jun. 11-15, 2017.

R. B. Vilim, "Automating O&M Monitoring Using Physics-Based Qualitative and Quantitative Reasoning," 2018 Pacific Basin Nuclear Conference, Sep. 30-Oct. 4, 2018, San Francisco, California.

R. Rusaw, "Requirements for On-Line Monitoring in Nuclear Power Plants", *Electric Power Research Institute*, Dec. 2008.

V. Venkatasubramanian, R. Rengaswamy and S. N. Kavuri, "A review of process fault detection and diagnosis Part II: Qualitative models and search strategies," *Computers and Chemical Engineering*, 27 (2003) 313-326.

V. Venkatasubramanian, R. Rengaswamy, S. N. Kavuri, and K. Yin, "A review of process fault detection and diagnosis Part III: Process history based methods," *Computers and Chemical Engineering*, 27 (2003) 327-346.

R. Vilim, Y. Park and A. Grelle, "Parameter-Free Conservation-Based Equipment Fault Diagnosis," *9th International Conference on Nuclear Plant Instrumentation, Control and Human-Machine Interface Technologies*, Charlotte, NC, Feb. 23-26, 2015.

Zhipeng Feng, Ming Liang and Fulei Chu, "Recent advances in time-frequency analysis methods for machinery fault diagnosis: A review with application examples," *Mechanical Systems and Signal Processing*, 38 (2013) 165-205.

Alexandros Mouzakitis, "Classification of Fault Diagnosis Methods for Control Systems," *Measurement and Control*, 46(10):303-308 (2013).

Raymond Reiter, "A Theory of Diagnosis from First Principles," *Artificial Intelligence*, 32 (1987) 57-95.

J. Kohlas, B. Anrig, R. Haenni and P.A. Monney, "Model-based diagnostics and probabilistic assumption-based reasoning," *Artificial Intelligence*, 104 (1998) 71-106.

Baoping Cai, Lei Huang and Min Xie, "Bayesian Networks in Fault Diagnosis," *IEEE Transactions on Industrial Informatics*, 13(5):2227-2240 (2017).

Haoyuan Zhang and D. William R. Marsh, "Generic Bayesian Network Models for Making Maintenance Decisions from Available Data and Expert Knowledged," *Proceedings of the Institution of Mechanical Engineers, Part O: Journal of Risk and Reliability*, Oct. 11, 2018.

Richard Vernon Beard, "Failure Accommodation in Linear Systems Through Self-Reorganization," *Massachusetts Institute of Technology*, Feb. 1971.

Jianping Ma and Jin Jiang, "Applications of fault detection and diagnosis methods in nuclear power plants: A review," *Progress in Nuclear Energy*, 53 (2011) 255-266.

Johan de Kleer and Brian C. Williams, "Diagnosing Multiple Faults," *Artificial Intelligence*, pp. 100-130 (1992).

Johan de Kleer and James Kurien, "Fundamentals of Model-Based Diagnosis," *IFAC Proceedings Volumes*, 36(5):25-36 (2003).

Yiqi Liu and Ali M. Bazzi, "A review and comparison of fault detection and diagnosis methods for squirrel-cage induction motors: State of the art," *ISA Transactions*, 70 (2017) 400-409.

Luca Console, Daniele Theseider Dupre' and Pietro Torasso, "A Theory of Diagnosis for Incomplete Causal Models," *Knowledge Representation*, pp. 1311-1317 (1989).

Ricardo Dunia, S. Joe Qin, Thomas F. Edgar and Thomas J. McAvoy, "Identification of Faulty Sensors Using Principal Component Analysis," *AIChE Journal*, 42(10):2797-2812 (1996).

Mattias Nyberg and Erik Frisk, "Model Based Diagnosis of Technical Processes," (2014).

M-O. Cordier et al., "AI and Automatic Control Approaches of Model-Based Diagnosis: Links and Underlying Hypotheses," *IFAC Fault Detection. Supervision and Safety for Technical Processes*, Budapest, Hungary, pp. 279-284 (2000).

Johan De Kleer and John Seely Brown, "A Qualitative Physics Based on Confluences," *Artificial Intelligence*, 24 (1984) 7-83.

J. Reifman and T. Y.C. Wei, "PRODIAG—Dynamic Qualitative Analysis for Process Fault Diagnosis," *Proceedings, 9th Power Plant Dynamics, Control of Testing Symposium*, May 24-26, 1995, Knoxville, Tennessee.

J. Reifman, T.Y.C. Wei, J.E. Vitela, C.A. Applequist and T.M. Chasensky, "PRODIAG—A Hybrid Artificial Intelligence Based Reactor Diagnostic System for Process Faults," *Proceedings, 4th International Conference on Nuclear Engineering*, New Orleans, USA, Mar. 10-14, 1996.

R.B. Vilim, "A Probabilistic Method for On-Line Response Prediction of Uncertain and Dynamic Systems," *Nuclear Science and Engineering*, 130:292-308 (1998).

John E. Edwards, "Design and Rating Shell and Tube Heat Exchangers," MNL 032A, Aug. 29, 2008.

N. Zavaljevski and K. C. Gross, "Sensor Fault Detection in Nuclear Power Plants Using Multivariate State Estimation Technique and Support Vector Machines," *Proceedings, Third International Conference of the Yugoslav Nuclear Society YUNSC 2000*, Oct. 2-5, 2000, Belgrade, Yugoslavia.

North Anna Power Station Updated Final Safety Analysis Report, Chapter 10: Steam and Power Conversion System, NAPS UFSAR, Sep. 29, 2016.

J.B. Coble et al., A Review of Sensor Calibration Monitoring for Calibration Interval Extension in Nuclear Power Plants, *Pacific Northwest National Laboratory operated by Battelle for the U.S. Department of Energy under Contract DE-ACO5-76RL01830*, Aug. 2012.

Ryan Prescott Adams and David J.C. MacKay, "Bayesian Online Changepoint Detection," arXiv:0710.3742v1, Oct. 19, 2007.

Allen B. Downey, "A novel changepoint detection algorithm," arXiv:0812.1237v1, Dec. 5, 2008.

V. Venkatasubramanian, R. Rengaswamy, K. Yin, and S. N. Kavuri, "A review of process fault detection and diagnosis Part I: Quantitative model-based methods," *Computers and Chemical Engineering*, 27 (2003) 293-311.

Z. Gao, C. Cecati, and S. X. Ding, "A Survey of Fault Diagnosis and Fault-Tolerant Techniques—Part I: Fault Diagnosis With Model-Based and Signal-Based Approaches," *IEEE Transactions on Industrial Electronics*, 62(6):3757-3767 (2015).

Z. Gao, C. Cecati, and S. X. Ding, "A Survey of Fault Diagnosis and Fault-Tolerant Techniques—Part II: Fault Diagnosis With Knowledge-Based and Hybrid/Active Approaches," *IEEE Transactions on Industrial Electronics*, 62(6):3768-3774 (2015).

P.M. Frank and X. Ding, "Survey of robust residual generation and evaluation methods in observer-based fault detection systems," *J. Proc. Cont.*, 7(6):403-424 (1997).

K. Zhang, B. Jiang, V. Cocquempot and H. Zhang, "A framework of robust fault estimation observer design for continuous-time/discrete-time systems," *Optim. Control Appl. Meth.*, 34:442-457 (2013).

(56) References Cited

OTHER PUBLICATIONS

E. Y. Chow and A. S. Willsky, "Analytical Redundancy and the Design of Robust Failure Detection Systems," *IEEE Transactions on Automatic Control*, 29(7):603-614 (1984).

S. Yin, S. X. Ding, X. Xie, and H. Luo, "A Review on Basic Data-Driven Approaches for Industrial Process Monitoring," *IEEE Transactions on Industrial Electronics*, 61(11):6418-6428 (2014).

P. J.F. Lucas, "Bayesian model-based diagnosis," *International Journal of Approximate Reasoning*, 27 (2001) 99-119.

Y. Peng, S. Zhang and R. Pan, "Bayesian Network Reasoning With Uncertain Evidences," *International Journal of Uncertainty, Fuzziness and Knowledge-Based Systems*, 18(5):539-564 (2010).

J. de Kleer, A. K. Mackworth and R. Reiter, "Characterizing Diagnoses and Systems," *Artificial Intelligence*, 56(2-3):197-222 (1992).

D. Poole, "A methodology for using a default and abductive reasoning system," *International Journal of Intelligent Systems*, 5(5):521-548 (1990).

J. Reifman and T.Y.C. Wei, "PRODIAG—A Process-Independent Transient Diagnostic System—I: Theoretical Concepts," *Nuclear Science and Engineering*, 131:329-347 (1999).

J. Gertler and D. Singer, "A New Structural Framework for Parity Equation-based Failure Detection and Isolation," *Automatica*, 26(2):381-388 (1990).

E. S. Page, "Control Charts for the Mean of a Normal Population," *Journal of the Royal Statistical Society. Series B (Methodological)*, 16(1):131-135 (1954).

Basseville et al., "Detection of Abrupt Change Theory and Application, Chapter 2 : Change Detection Algorithms," PTR Prentice-Hall (1993).

F. F. Gan, "EWMA Control Chart Under Linear Drift," *J. Statist. Comput. Simul.*, 38:181-200 (1991).

C. Zou, Y. Liu and Z. Wang, "Comparisons of control schemes for monitoring the means of processes subject to drifts," *Metrika*, 70:141-163 (2009).

H. M. Fahmy & E. A. Elsayed, "Detection of linear trends in process mean," *International Journal of Production Research*, 44(3):487-504 (2006).

L. Xu, S. Wang and M. R. Reynolds, Jr., "A Generalized Likelihood Ratio Control Chart for Monitoring the Process Mean Subject to Linear Drifts," *Qual. and Reliab. Engng. Int.*, 29:545-553 (2013).

\* cited by examiner

PHYSICS-CONSTRAINED SENSOR ASSIGNMENT OPTIMIZATION METHOD FOR THERMAL HYDRAULIC SYSTEMS

STATEMENT REGARDING FEDERALLY SPONSORED RESEARCH OR DEVELOPMENT

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to methods and systems for diagnosing faults, and specifically, to diagnosing faults in components of systems such as thermal hydraulic systems.

BACKGROUND

Large, complex systems such as process control plants and power plants generally require constant monitoring and maintenance to prevent equipment degradation and accidents. Depending on the complexity of the systems involved, operations and maintenance (O&M) costs can be a significant challenge in various industries, including the nuclear energy industry. Computational diagnostic frameworks are generally utilized to monitor for and diagnose faults within these systems. However, improving computational diagnostic frameworks for detecting and diagnosing faults faces many technical challenges.

For example, an ideal diagnostic framework would be capable of detecting small equipment degradations that occur over long timescales. However, increasing the sensitivity of a fault detection algorithm can generate false positives. Further, measurement uncertainties, noise, and changes in operating conditions of the system can also affect the accuracy of the fault detection algorithm. As another example, computational diagnostic frameworks may be unable to uniquely identify faults based on available sensor measurements, and may only be able to suggest a list of possible faults. In addition, some existing computational diagnostic frameworks assume the accuracy of sensor readings and cannot simultaneously detect component and sensor faults.

Further, hardware-related solutions, such as installing redundant sensors, often require high installation and maintenance costs. Installing additional diagnostic hardware also may not improve diagnostic capability to an extent that justifies the increased cost. Moreover, when designing a system, the systems engineer may be unaware of how to place diagnostic equipment in a way that ensures a given level of diagnostic capability.

Accordingly, there is a need for improved computational diagnostic frameworks that address these technical challenges in a cost-effective manner without sacrificing accuracy.

SUMMARY OF THE DISCLOSURE

A method for determining an optimal sensor set can be performed by one or more processors and includes identifying a set of possible faults of a thermal hydraulic system and a set of diagnostic objectives associated with the set of possible faults. The method also includes obtaining a plurality of descriptions of a respective plurality of sensor sets, wherein obtaining the plurality of descriptions includes: receiving a first description of a first sensor set of the plurality of sensor sets, and generating, based on the first description, a second description of a second sensor set of the plurality of sensor sets, wherein each description of the plurality of descriptions includes types of sensors of the respective sensor set of the plurality of sensor sets and locations of the sensors of the respective sensor set. The method further includes, for each particular sensor set of the plurality of sensor sets: determining based on a particular description of the plurality of descriptions that corresponds to the particular sensor set, a diagnostic capability of the particular sensor set corresponding to diagnostic objectives of the set of diagnostic objectives that are met by the particular sensor set, and calculating a score of the particular sensor set based on the particular description and the diagnostic capability, wherein a score of a sensor set is increased by a monetary cost of the sensor set and decreased by the sensor set meeting a diagnostic objective of the set of diagnostic objectives. The method also includes identifying the optimal sensor set that has a lowest score of the plurality of sensor sets, and displaying an indication of the optimal sensor set.

A computer system for determining an optimal sensor set can include one or more processors and a non-transitory computer-readable medium storing thereon instructions, that, when executed by the one or more processors, cause the system to perform the above method.

DETAILED DESCRIPTION

Overview

Figure 1:
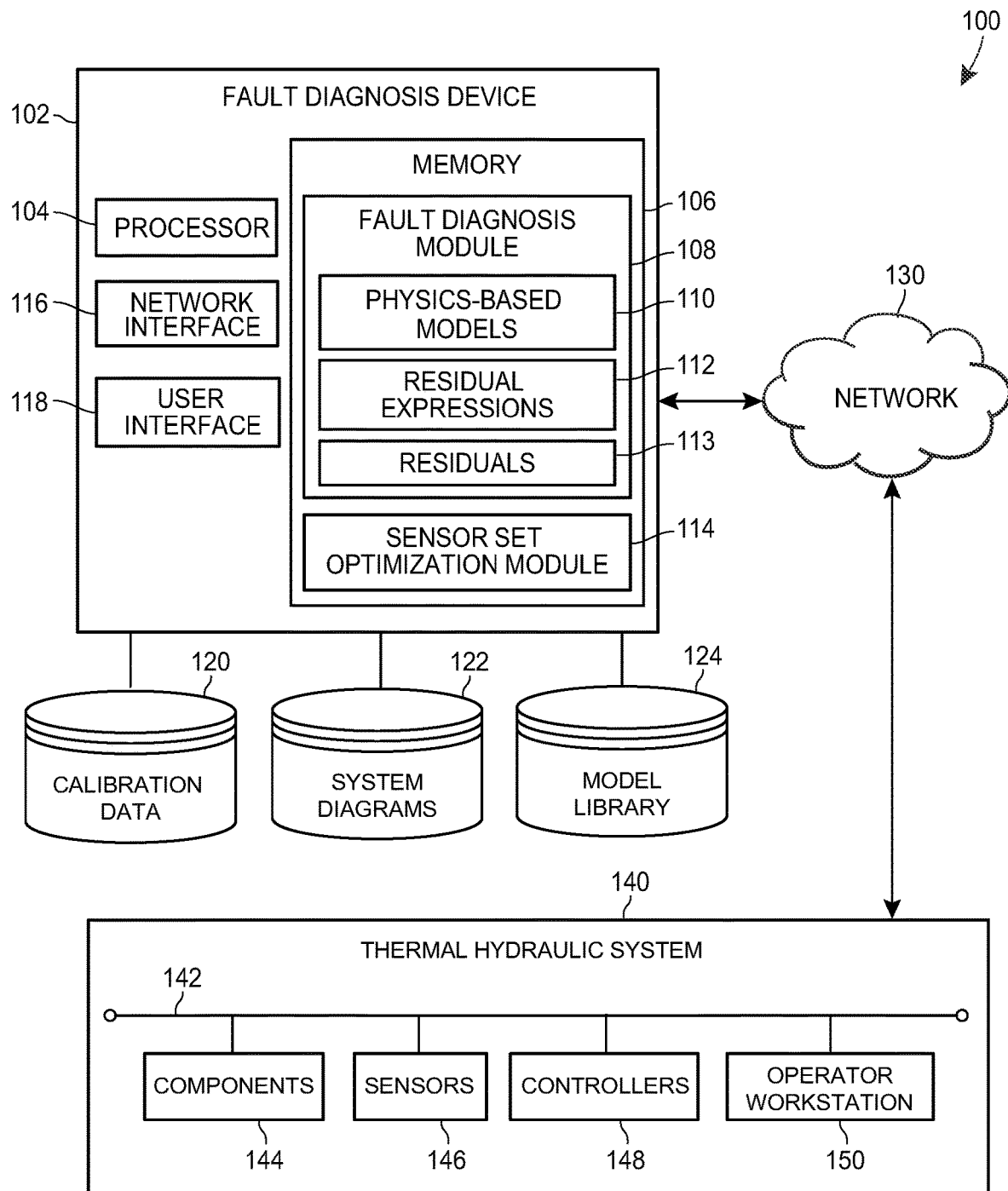
FIG. 1 is a block diagram of a system for diagnosing faults of a thermal hydraulic system.

The disclosed methods and systems describe techniques for diagnosing faults in systems, such as thermal hydraulic systems. The disclosed techniques include constructing physics-based models for one or more components of a system based on physical conservation laws. The physics-based models can be in the form of parametric equations and may be calibrated using historical sensor measurements of the system. Physical and geometric constants can be described using unknown parameters that are calculated during the calibration process. As a result, the physics-based models can be constructed using only a schematic diagram, such as a piping and instrumentation diagram (P&ID), of the system showing the components, sensors, and interconnections between the components.

Based on analytical redundancy relations of the physics-based models, residual expressions are generated that represent differences between predictions of the physics-based models and observed sensor measurements. By inserting real-time sensor measurements into the residual expressions, residuals can be calculated. A non-zero residual indicates a difference between a prediction and system behavior—i.e., a fault of the component associated with the physics-based model or a sensor of the system. Thus, by analyzing the non-zero residuals using a fault diagnosis framework, a fault diagnosis of the system can be generated. Further, analytical redundancy relations remain valid despite changes in operating conditions, enabling the fault diagnosis techniques of this disclosure to be insensitive to such changes.

Further, both modeling and measurement uncertainty can be accounted for by evaluating whether residuals are statistically non-zero using a change detection algorithm—thereby preventing false positives. Further, modeling and measurement uncertainty can be quantified and incorporated into the change detection algorithm to tailor the sensitivity of the algorithm to a system of interest. In addition, a probabilistic diagnosis framework can be utilized in order to determine the probabilities of possible faults. Accordingly, computing devices implementing these techniques can distinguish the likelihoods or two or more possible faults.

Moreover, the techniques of this disclosure can also be used to determine an optimal sensor arrangement to provide a requisite degree of monitoring capability. That is, given a particular monitoring need, these techniques can generate a recommended sensor set that meets the monitoring need at minimal cost.

The systems and methods of this disclosure offer numerous benefits. Fault diagnoses can be made in real time based on live sensor measurements. In addition, the techniques of this disclosure are configured to detect even small degradations of sensors and/or components that can occur over long timescales. Thus, a system operator can use the techniques of this disclosure to monitor the health of a system as the system is operating. These techniques can therefore reduce O&M costs of systems by pinpointing faults in both sensors and components as system equipment begins to degrade over time.

Further, the disclosed techniques are based on the underlying physics of component operation. Many existing techniques are based on data-driven algorithms, which require a large amount of training data that may not be available for all systems. Further, these data-driven algorithms are generally black-boxes, making it difficult to determine how and where errors are introduced.

While some existing techniques do utilize underlying physics (i.e., first-principles) to construct models, such existing techniques generally rely on qualitative trends. System information is also lost when transforming inherently quantitative data describing system operation into qualitative form, which can lead to incorrect diagnoses. In addition, these techniques generally do not account for the possibility of sensor faults and have difficulty identifying multiple-fault events. By contrast, this disclosure describes generating quantitative physics-based models. In particular, the techniques of this disclosure enable tailoring of generic physics-based models to a particular system by calibrating physics-based models using historical measurements of the particular system. As a result, the physics-based models of this disclosure more accurately describe operation of the particular system of interest. These quantitative physics-based models can be used to identify both component faults and sensor faults, and to identify multiple-fault events. Further, these quantitative physics-based models can be used to identify slow-forming faults caused by degradations over long timescales, which may be missed with existing qualitative physics-based models.

The disclosed techniques also account for uncertainty by statistically analyzing residuals, as described above. Further, both prior probabilities of faults, and posterior probabilities of faults (i.e., the probability that a given fault has occurred given a set of observations) are incorporated into applied fault diagnosis frameworks. As a result, the disclosed techniques can be used to identify the most probable fault diagnosis among a group of possible fault diagnoses.

Combining the various techniques of this disclosure can lead to further advantages. For example, a user can apply these techniques to identify an optimal sensor arrangement that will satisfy diagnostic objectives at a minimum cost. After the optimal sensor set is installed, the user can monitor the health of the system using the optimal sensor set and the fault diagnosis techniques described below.

It should be understood that while this disclosure primarily refers to diagnosing faults of a thermal hydraulic system, the techniques of this disclosure can apply to diagnosing faults in any system. In particular, the techniques of this disclosure can apply to any system which operates in accordance with physical conservation laws. For example, while this disclosure primarily refers to the example of a thermal hydraulic system, through which liquids in different phases flow, the techniques of this disclosure are also applicable to electrical systems, through which electrical currents flow, or to combined thermal hydraulic and electrical systems. Electrical components of a thermal hydraulic system, such as motors, can therefore also be analyzed using the techniques of this disclosure.

Example Computing Environment

FIG. 1 is a block diagram of an example system 100 configured to implement the techniques of this disclosure for diagnosing faults of a thermal hydraulic system. It should be appreciated that the system 100 is merely an example and that alternative or additional components are envisioned.

The system 100 may include a fault diagnosis device 102 configured to communicate with a thermal hydraulic system 140 via a network 130. The network 130 may include any suitable combination of wired and/or wireless communication network, and may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, cellular network, and others). While FIG. 1 depicts only one network 130, the fault diagnosis 102 and the thermal hydraulic system 140 may additionally or alternatively communicate via a plurality of networks, depending on the implementation, and still fall within the scope of the present disclosure. For example, the network 130 may include any one or more of an Ethernet-based network, a private network, a cellular network, a local area network (LAN), and/or a wide area network (WAN), such as the Internet.

The fault diagnosis device 102 includes one or more processor(s) 104, which may be general purpose (e.g., CPUs) and/or special purpose processor(s), and a memory 106. The memory 106 may be a non-transitory memory and can include one or several memory modules, such as random access memory (RAM), read-only memory (ROM), flash memory, or other types of persistent memory, etc. The memory 106 can store computer-readable instructions executable on the processor 104. It will be understood that although the fault diagnosis device 102 is illustrated in FIG. 1 as a single device, in general the fault diagnosis device 102 can correspond to multiple computing devices.

The memory 106 may store a fault diagnosis module 108. The fault diagnosis module 108 may be configured to generate and calibrate physics-based models, generate residuals by applying calibrated physics-based models to data received from the thermal hydraulic system 140, and diagnose faults using the techniques discussed below with reference to FIGS. 2-8C and 10-11. In particular, the fault diagnosis module 108 may generate physics-based models 110 and residual expressions 112. The fault diagnosis module 108 may evaluate the residual expressions 112 using data from the thermal hydraulic system 140 to generate residuals 113, as will be described with reference to FIG. 2. In some implementations, the memory 106 also stores a sensor set optimization module 114, which is configured to determine an optimal sensor set for a system using the techniques discussed below with reference to FIGS. 9 and 12.

In some implementations, the fault diagnosis module 108 and the sensor optimization module 114 may be stored as computer-readable instructions executable on the processor 104. For example, the fault diagnosis module 108 and/or the sensor set optimization module 114 may be implemented as separate, standalone applications or within the same application executing on the fault diagnosis device 102. It should also be noted that although FIG. 1 illustrates the modules 108 and 114 as stored on the memory 106, the modules 108 and 114 can also be provided in the form of online services accessible via a web browser executing on the fault diagnosis device 102, as plug-ins or extensions for another software application executing on the fault diagnosis device 102, as instructions on a cloud-based memory, etc.

Further, in some implementations, functionalities of the fault diagnosis module 108 and/or the sensor set optimization module 114 may be performed by different computing devices and/or different applications. As one example, a first computing device may construct the physics-based models 110, generate the residual expressions 112, and provide the physics-based models 110 and the residual expressions 112 to a second computing device (e.g., as computer-readable instructions), which in turn generates the residuals 113 using data from the thermal hydraulic system 140 and diagnoses faults of the thermal hydraulic system 140. A third computing device may implement the sensor set optimization module 114 to determine an optimal sensor set, and may request fault diagnosis capabilities of sensor sets from the first and second computing devices.

In addition, the fault diagnosis device 102 includes a network interface 116 configured to communicate data with other computing devices and systems, such as the thermal hydraulic system 140, via the network 130. The network interface 116 may include one or more transceivers (e.g., WWAN, WLAN, and/or WPAN transceivers) functioning in accordance with IEEE standards, 3GPP standards, or other communication standards, and configured to receive and transmit data via one or more external ports.

The fault diagnosis device 102 also includes a user interface 118. The user interface 118 includes hardware, firmware, and/or software configured to enable a user to interact with (i.e., both provide inputs to and perceive outputs of) the fault diagnosis device 102. For example, the user interface 118 may include a touchscreen with both display (e.g., video display device) and manual input capabilities. Alternatively, or in addition, the user interface 118 may include a keyboard for accepting user inputs, and/or a microphone (with associated processing components) that provides voice control/input capabilities to the user. As another example, the user interface 118 may include speakers capable of emitting audio. The user interface 118 may include a combination of peripheral devices (e.g., a keyboard and mouse) and one or more display screens. A user may interact with the user interface 118 to configure the fault diagnosis module 108, view and/or adjust the physics-based models 110, view and/or adjust the residual expressions 112, view the residuals 113, configure the sensor optimization module 114, view fault diagnoses, etc. For example, the fault diagnosis module 108 and/or the sensor optimization module 114 may implement graphical user interfaces that the fault diagnosis device 102 can display and a user can interact with via the user interface 118.

The fault diagnosis device 102 may be communicatively connected to databases such as a calibration database 120, a system diagrams database 122, and a model library 124. The calibration database 120 may be populated with historical data gathered by the thermal hydraulic system 140. As will be discussed below, the fault diagnosis device 102 can use historical data stored in the calibration database 120 to calibrate the physics-based models 110. The system diagrams database 122 may include diagrams, schematic representations, or textual descriptions of systems. For example, the system diagrams database 122 may store P&IDs of systems. A P&ID of a system represents the system as an interconnected collection of components and identifies the locations of sensors. The model library 124 includes descriptions of previously-constructed physics based models, including, for each model, the type of component to which the model applies and the sensors required to calibrate the model. The model library 124 can also include residual expressions obtainable from analytical redundancy relations of each model. The fault diagnosis device 102 may store the physics-based models 110 that the fault diagnosis device 102 constructs in the model library 124, and may retrieve models from the model library 124. The databases 120, 122, and 124 may use any known database architecture. Further, one or more or the databases 120, 122, and 124 may be implemented using cloud technology and may reside on a distributed network of computing devices rather than a single computing device. In some embodiments, the fault diagnosis device 102 may store all or portions of the databases 120, 122, and/or 124 in the memory 106.

The fault diagnosis device 102 is communicatively coupled via the network 130 to a system in which faults are to be diagnosed, such as the thermal hydraulic system 140. The thermal hydraulic system 140 may be, for example, a process control plant, a nuclear power plant, a nuclear reactor, a nuclear engineering system, a steam power plant, a thermal power plant or other type of power plant, chemical plant, or the like, or a system within these systems. As described above, the system in which faults are to be diagnosed need not be a thermal hydraulic system, per se, but may be any whole or partial system or process plant that can be modeled using first-principles (i.e., physics-based) models.

The various parts of the thermal hydraulic system 140 may be communicatively connected via wired or wireless connections to a data bus 142. The data bus 142 may in turn by communicatively connected to the fault diagnosis device 102 via the network 130. The thermal hydraulic system 140 includes components 144 (e.g., pumps, valves, heat exchangers, heaters, condensers, pipes, junctions, motors, etc.) and sensors 146. In some implementations, the components 144 may include only a single component (or only a single component of the components 144 may be analyzed). The sensors 146 may monitor conditions of the thermal hydraulic system 140 as a whole or may monitor parameters of the components 144 (e.g., flow rate, temperature, pressure, etc.). The sensors 146 may be affixed onto the components 144 or be installed within or be part of the components 144.

The thermal hydraulic system 140 also includes one or more controllers 148 including control circuitry for controlling the components 144 and the sensors 146. For example, the controllers 148 may control the activation and/or deactivation and modify settings of the components 144 and the sensors 144. Further, the controllers 148 may modify notification settings of the sensors 146 (e.g., what information the sensors 146 provide to the data bus 142 and at what times). The controllers 148 may transmit data and instructions to the components 144 and the sensors 146 via the data bus 142, and may receive information (e.g., responses to the instructions, measurements from the sensors 146) from the components 144 and the sensors 146 via the data bus 142. The controllers 148 also may provide data (e.g., data exchanged with parts of the thermal hydraulic system 140) to the data bus 142. This data may include indications of parts of the thermal hydraulic system 140 that are activated or deactivated (e.g., including timestamps), as well as indications of controlled settings and indications of instances in which controlled settings are modified (e.g., including timestamps).

A user, such as a plant operator, may issue instructions to the controllers 148 and monitor information received from the data bus 142 (e.g., from the controllers 148, components 144, or the sensors 146) via an operator workstation 150. The operator workstation 150 may be a personal computer, a laptop, a smartphone, a tablet, a wearable portable device, etc. Generally speaking, the operator workstation 150 may include a processor, a memory, a network interface, and a user interface (e.g., including a display and user inputs), similar to the fault diagnosis device 102. The thermal hydraulic system 140 may include multiple operator workstations 150 and/or multiple controllers 148. For example, each system component of the components 144 may be associated with a different controller or controllers. Each controller may be associated with one operator workstation, or an operator workstation can be used to configure multiple controllers. The fault diagnosis device 102 can transmit fault diagnoses or other output data to the operator workstation, which can display, present, or process the fault diagnoses and/or output data. Likewise, the operator workstation 150 can manage transmission of input data from the thermal hydraulic system 140 to the fault diagnosis device 102.

The fault diagnosis device 102 may generate alerts including output data such as a diagnosed fault. The fault diagnosis device 102 may itself present generated alerts to a user of fault diagnosis device 102. For example, the alert may be a notification that can be displayed by a display of the user interface 118 and/or an audio notification that can be emitted by a speaker of the user interface 118. Alternatively, or in addition, the fault diagnosis device 102 can transmit the alert to the operator workstation 150, the controllers 148, or another computing device of the thermal hydraulic system 140. The operator workstation 150 can then display or otherwise present the alert to a user, or transmit an indication of the alert to the controllers 148. For example, the operator workstation 150 (or the fault diagnosis device 102) can generate a remedial action (e.g., to turn off a faulty component or sensor, or redirect flow away from a faulty component or sensor) based on a fault diagnosis, and transmit control instructions to one of the controllers 148 to cause the fault diagnosis system 140 to perform the remedial action.

Figure 9:
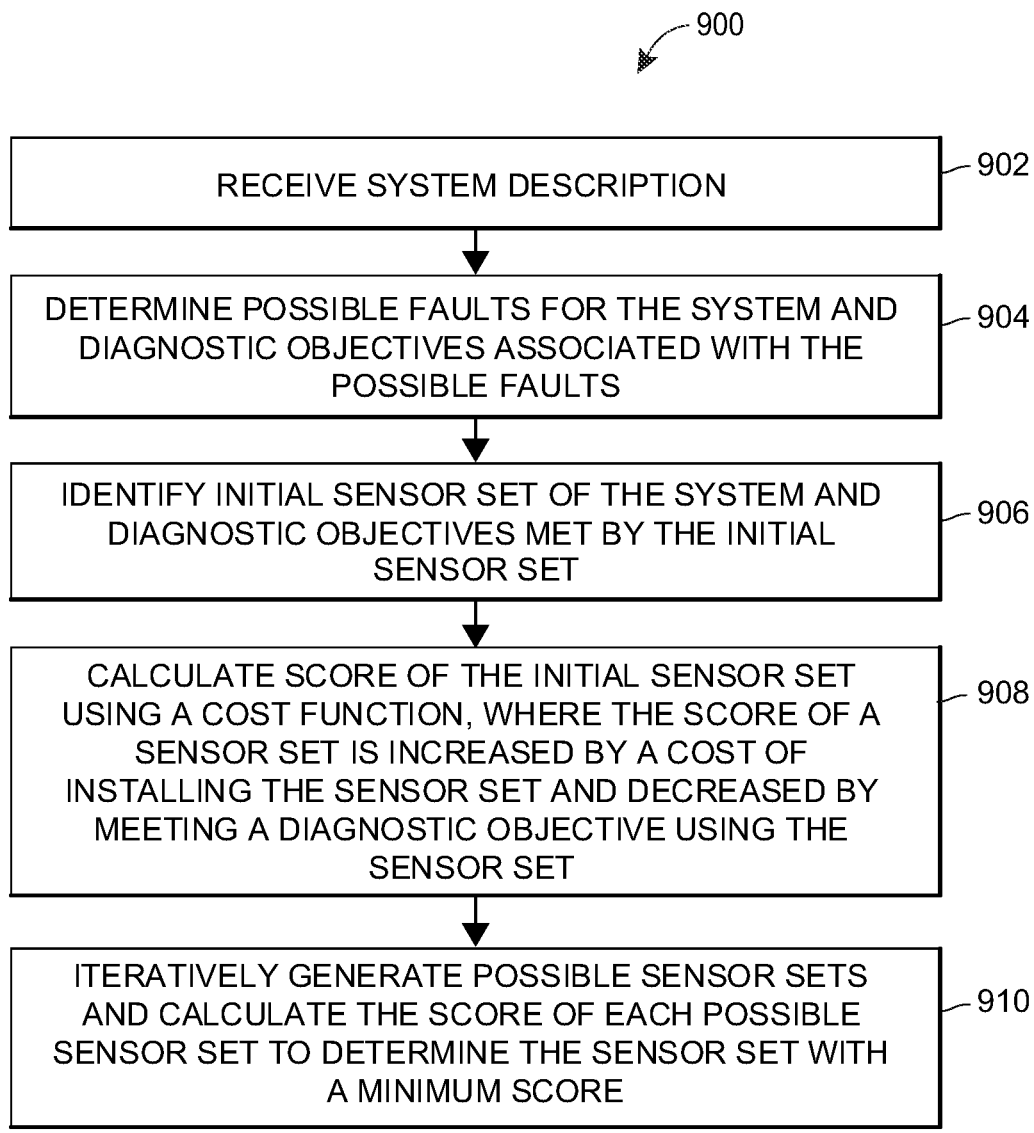
FIG. 9 is a flow diagram of an example method for optimizing a sensor set for a thermal hydraulic system.
Figure 10:
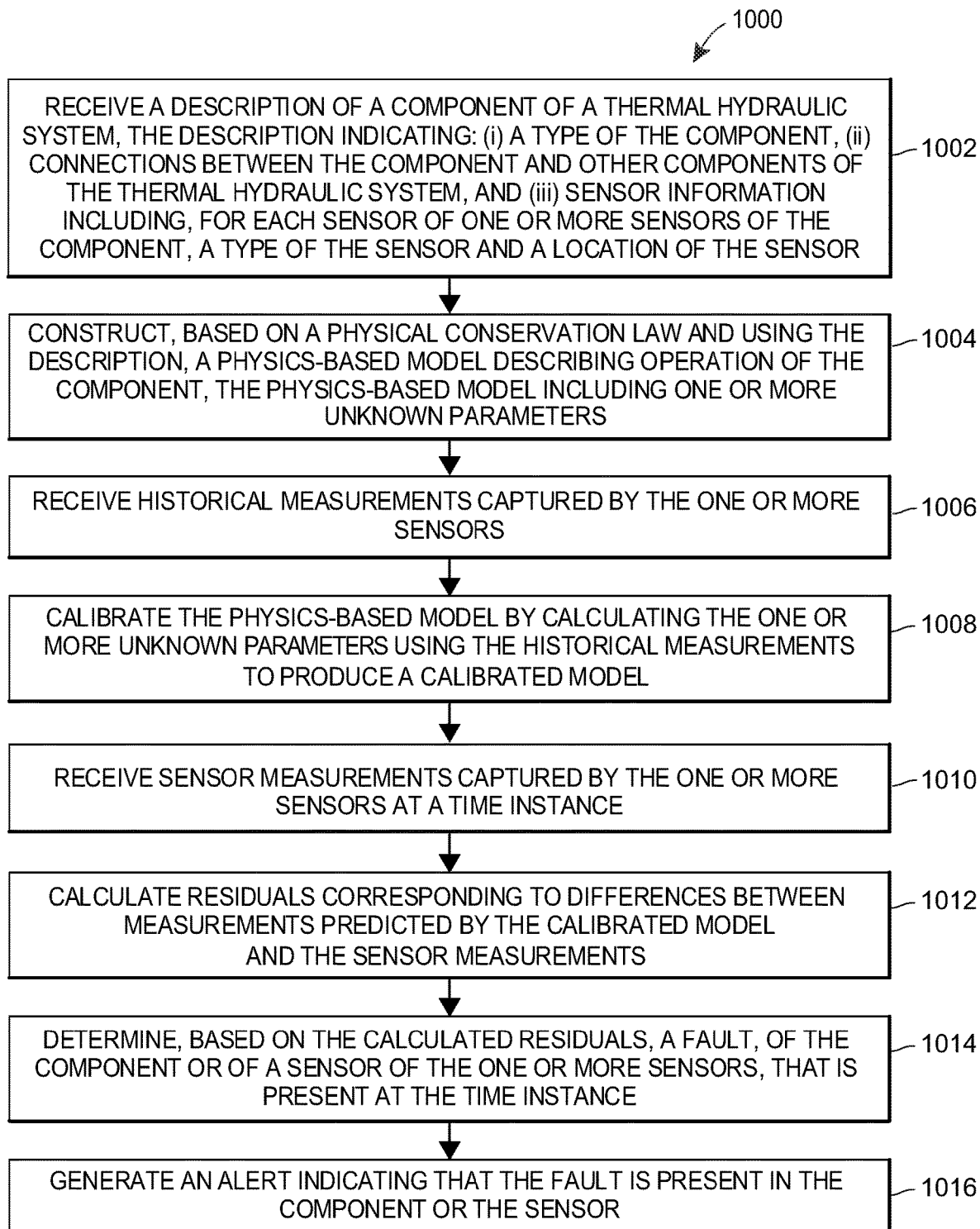
FIG. 10 is a flow diagram of an example method for diagnosing faults associated with a component of a thermal hydraulic system.
Figure 11:
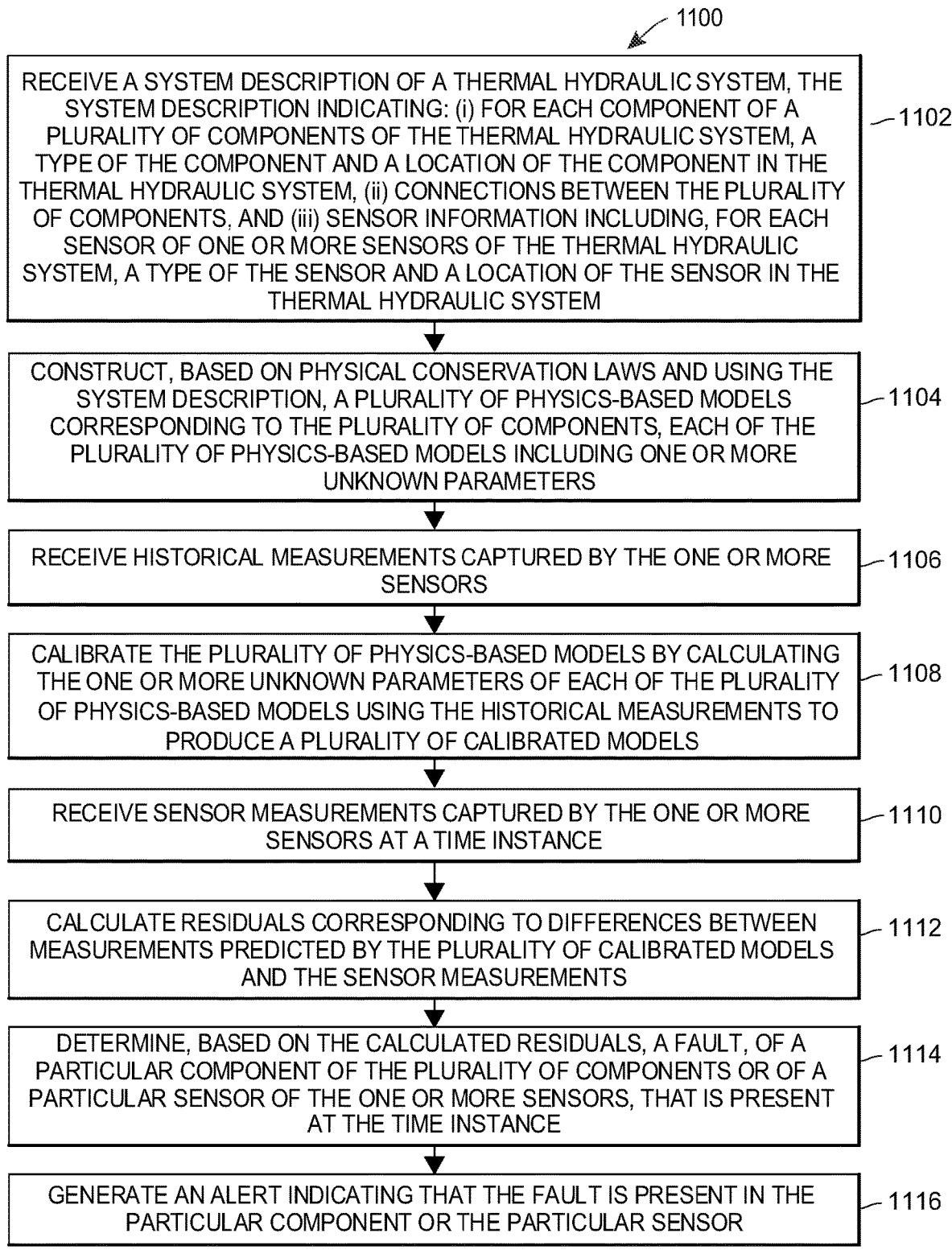
FIG. 11 is a flow diagram of an example method for diagnosing faults in a thermal hydraulic system.
Figure 12:
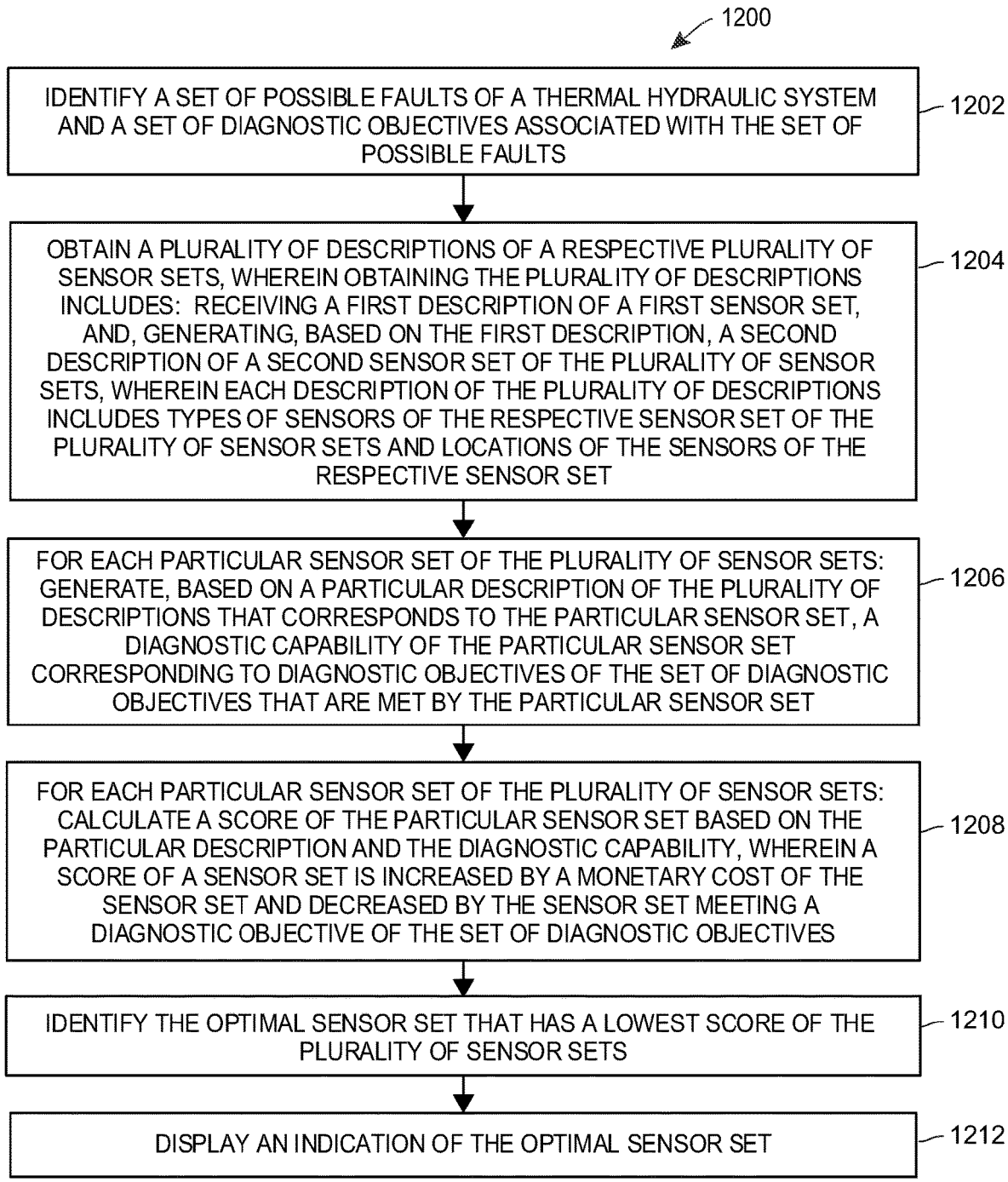
FIG. 12 is a flow diagram of an example method for determining an optimal sensor set of a thermal hydraulics system.

The techniques of this disclosure can be used to both (i) diagnose faults in a single component (or a sensor associated with the component) using sensor measurements of the component and to (ii) diagnose faults in one or more components or sensors of a system (e.g., the thermal hydraulic system 140) using sensor measurements of the system (i.e., using sensor measurements of at least two components of the system). FIGS. 2-5 illustrate the techniques for diagnosing faults in a single component, and FIGS. 6-8C illustrate how this component approach can be extended to diagnose faults in the system. Further, the techniques of this disclosure can also be used to solve the inverse problem—i.e., given a set of faults, what is the optimal sensor arrangement to provide a requisite degree of monitoring capability. FIG. 9 illustrates this sensor assignment optimization technique. FIGS. 10-12 illustrate example methods of this disclosure.

Fault Diagnosis Framework for Standalone Component

Figure 2:
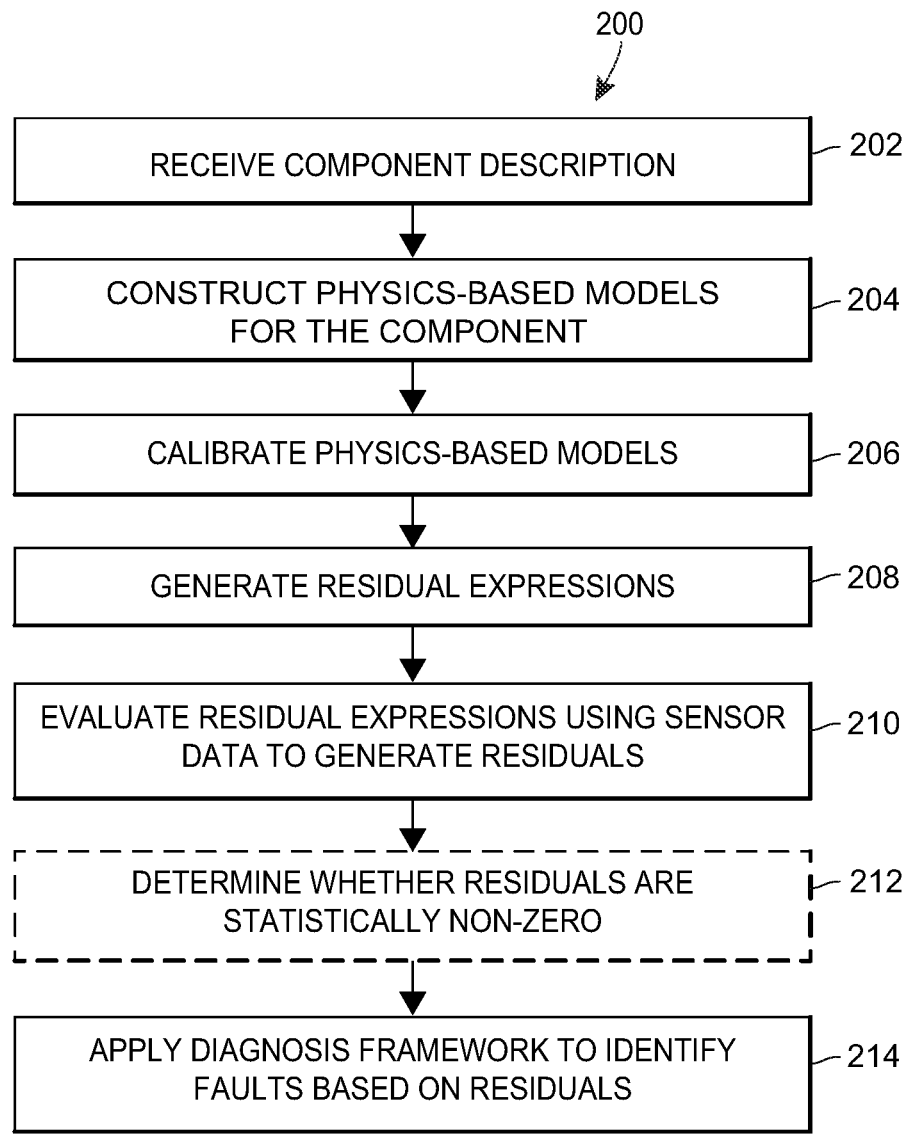
FIG. 2 is flow diagram of an example method for diagnosing faults in a standalone component of a thermal hydraulic system.

FIG. 2 is flow diagram of an example method 200 for diagnosing faults in for a standalone component of the thermal hydraulic system 140. By "standalone" component, this disclosure refers to a single component (e.g., a single component of the components 144). In some embodiments, the thermal hydraulic system 140 includes a single component. In other embodiments, while the thermal hydraulic system 140 includes multiple components, the method described in FIG. 2 analyzes only the single component (and sensors of the single component) of the multiple components to diagnose faults of the single component.

Further, the method 200 is described below as performed by the fault diagnosis device 102. In particular, the fault diagnosis device 102 may implement the fault diagnosis module 108 in order to execute the method 200. However, depending on the implementation and/or scenario, individual steps of the method 200 may be performed by different computing devices and/or applications.

The method 200 includes the fault diagnosis device 102 receiving a description of the component (block 202). The description of the component indicates the type of component. For example, in the case of the thermal hydraulic system 140, each component of the components 144 belongs to a generic type, such as pump, valve, heat exchanger, heater, motor, etc. The description also may indicate the sub-type of the component (e.g., whether a heat exchanger is a counterflow heat exchanger). The description also identifies the locations and types of sensors of the component (e.g., pressure, temperature, or flow rate). Further, the description identifies whether the component 144 has any connections with other components (i.e., interconnections), such as inlets or outlets where mass can enter or leave the component. Depending on the implementation, the description need not include geometric parameters of the component (e.g., lengths, diameters, and other size measurements of the component). In some implementations, the description may be a description of the system in which the component is located (e.g., the thermal hydraulic system 140), and the fault diagnosis device 102 may extract the component description from the system description. The fault diagnosis device 102 can retrieve the description from the systems diagrams database 122, for example.

Figure 3:
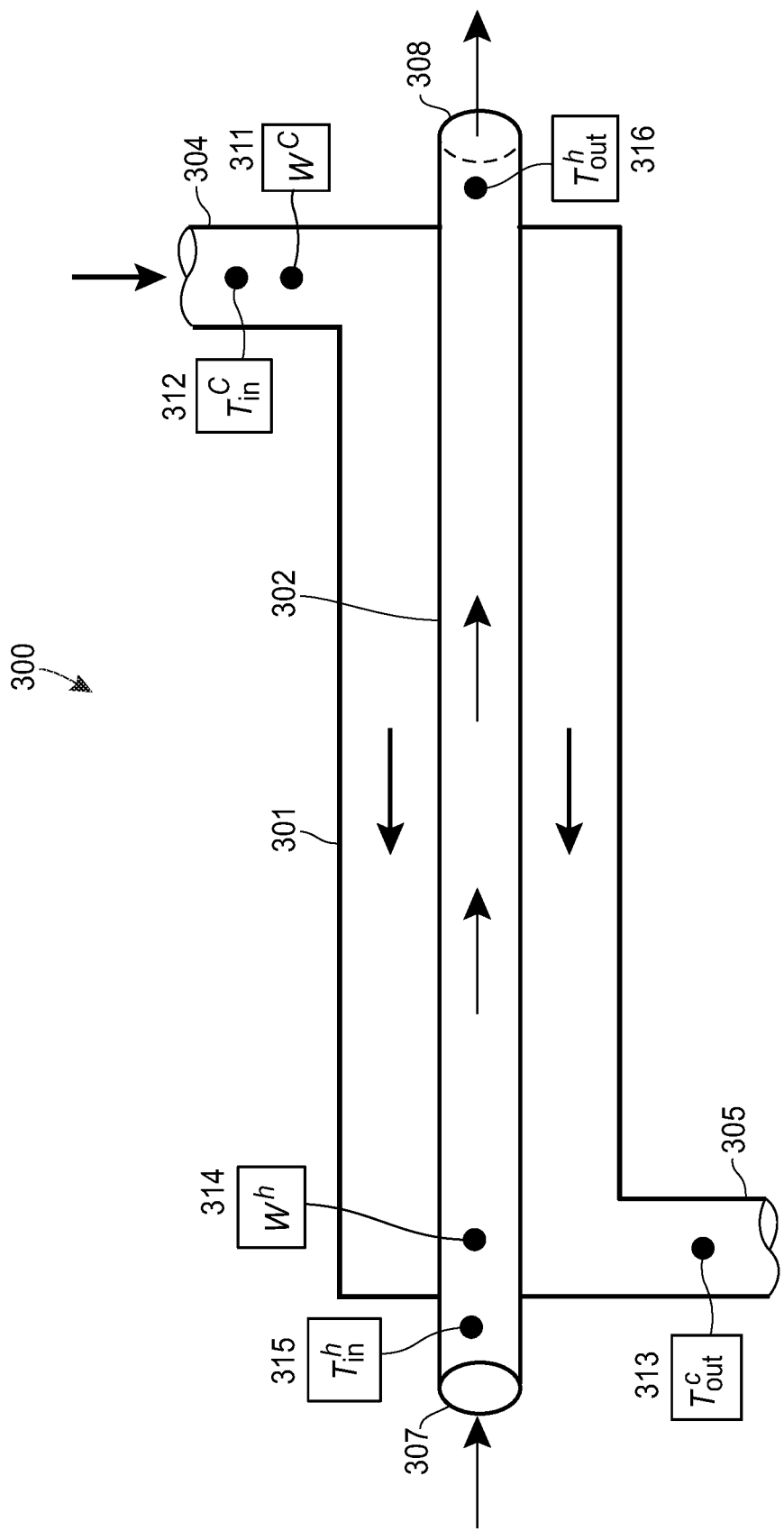
FIG. 3 is a schematic diagram illustrating an example counterflow heat exchanger and sensor locations.

Referring briefly to FIG. 3, a schematic diagram illustrates an example counterflow heat exchanger 300 and sensors of the heat exchanger 300. The heat exchanger 300 is an example component of the components 144. The description that the fault diagnosis device receives at block 202 may include an indication that the component is a heat exchanger, and may include the schematic diagram illustrated in FIG. 3, a P&ID including the heat exchanger 300, or a textual description of the features such as sensor locations and sensor types illustrated in FIG. 3.

The heat exchanger 300 includes an outer tube 301 carrying a first fluid flowing to the left (as indicated by the arrows) and an inner tube 302 carrying a second fluid flowing to the right. The first fluid enters the outer tube 301 at an inlet 304 and exits the outer tube at an outlet 305. Similarly, the second fluid enters the inner tube 302 at an inlet 307 and exits the inner tube at an outlet 308. The first fluid at the inlet 304 is colder than the second fluid at the inlet 307. Accordingly, along the length of the heat exchanger 300, heat is exchanged from the second fluid to the first fluid. The heat exchanger 300 includes flow rate sensors 311 and 314, measuring $w^c$ and $w^h$ respectively, where w represents flow rate (e.g., a mass flow rate kg/s) and the superscripts c and h refer to the cold side (i.e., the outer tube for the first fluid) and the hot side (i.e., the inner tube for the second fluid), respectively. Further, the heat exchanger 300 includes temperature sensors 312, 313, 315, and 316, measuring $T_{in}^c$, $T_{out}^c$, $T_{in}^h$, and $T_{out}^h$, respectively, where T refers to temperature, in refers to inlet, and out refers to outlet. As a shorthand, this disclosure may refer to the sensors 311-316 as sensors $S_1$, $S_2$, $S_3$, $S_4$, $S_5$, and $S_6$, respectively.

Turning back to FIG. 2, after receiving the component description (block 202), the fault diagnosis device 102 constructs one or more physics-based models (e.g., one or more physics based models of the physics-based models 110) for the component (block 204). A physics-based model for the component models the operation of the component in accordance with underlying physics. In the example method 200, the fault diagnosis device 102 constructs the physics-based models using one or more physical conservation laws, such as conservation of energy, conservation of mass, and conservation of momentum. While this disclosure primarily refers to using physical conservation laws to generate the physics-based models, the techniques of this disclosure can be used to generate physics-based models according to any physical principles—that is, according to the underlying physics of the component rather than mere data analysis.

In the context of the thermal hydraulic system 140, each of the components 144 is of different types (e.g., valve, pump, heat exchanger, etc.). Each type of component performs functions related to mass, momentum, and/or energy transfer. Accordingly, for each type of component, up to three separate physics-based models can be constructed based on conservation of mass, momentum, and/or energy, respectively. Each physics-based model may be associated with one or more equations, as will be described below.

These physics-based models can be utilized to detect faults in the component or sensors associated with the component. In this disclosure, the term "fault" refers to any change in the characteristics of a component (including in the characteristics of a sensor) that affect the ability of the component to perform its designed function. A particular component may be capable of experiencing multiple types of faults. A fault causes an inconsistency between actual, observed behaviors of the component and behaviors predicted by a model. Because the models utilized in this disclosure are physics-based models based on conservation equations, any fault in the component results in an imbalance in the conservation equations. Thus, a difference between a prediction of the physics-based model and an observation result indicates a fault.

Mathematically, conservation of mass, momentum, and energy for a one-dimensional incompressible flow through a component with a single inlet and outlet can be expressed, respectively, as:

$$\frac{dm}{dt} = w_{in} - w_{out} \quad \text{(Equation 1)}$$

$$\left(\frac{l}{A}\right)_\tau \frac{dw}{dt} = \quad \text{(Equation 2)}$$

$$P_{in} - P_{out} + \rho g h(z_{in} - z_{out}) + \frac{w^2}{2\rho}\left(\frac{1}{A_{in}^2} - \frac{1}{A_{out}^2}\right) - \Delta P_{loss}$$

$$\frac{dH}{dt} = w_{in} h_{in} - w_{out} h_{out} + Q_{eng} \quad \text{(Equation 3)}$$

where the in and out refer to the inlet and outlet locations, m is the total fluid mass enclosed by the component, w refers to mass flow rate (as above), P refers to pressure, A refers to cross-sectional area, $(l/A)_\tau$ is the equivalent inertia length for the component defined by its geometric dimensions, ρ is the fluid density, g is the gravitational acceleration constant, z refers to relative elevation at each location of the flow, $\Delta P_{loss}$ denotes the total pressure loss (e.g., due to friction losses), H refers to the total energy enclosed in the component, h denotes the specific enthalpy, and $Q_{eng}$ is the total heat transfer rate, also known as a combined energy source/sink term.

Considering quasi-static conditions, the derivatives with respect to time in the conservation expressions above can be set to zero. Using these conservation expressions, the fault diagnosis device 102 can construct the physics-based models for a component.

An example physics-based model constructed using conservation of mass (i.e., Equation 1) for a component is therefore:

$$\Sigma w_{in} = \Sigma w_{out} \quad \text{(Equation 4)}$$

where the summations are over the total number of inlet and outlet locations. The fault diagnosis device 102 may automatically construct a physics-based model using conservation of mass by identifying the total number of inlet and outlet locations of the component, and expressing the physics-based model in terms of sensor measurements of flow rates at the inlet and outlet locations. Thus, to evaluate the performance of a component using such a model, a set of flow rate sensors at each inlet and outlet location is required.

An example physics-based model based on conservation of momentum can be constructed from Equation 2. The loss term $\Delta P_{loss}$ generally is either a first order term or a second order term (i.e., depends on either w or $w^2$). Thus, for the physics-based model, the fault diagnosis device 102 can select a parametric equation with quadratic dependence on w:

$$P_{in} - P_{out} = \theta_0 + \theta_1 w + \theta_2 w^2 \qquad \text{(Equation 5)}$$

where $\theta_0$, $\theta_1$, and $\theta_2$ are parameters capturing physical constants and geometric characteristics of the component. The values of these parameters, for different components, are calculated during the model calibration phase discussed below. The flow rate w can be the flow rate at either the inlet or outlet. The fault diagnosis device 102 can therefore automatically construct a physics-based model using conservation of momentum in accordance with Equation 5. Calibration and subsequent use of this model requires at least three sensors to measure: inlet pressure $P_{in}$, outlet pressure $P_{out}$, and flow rate w at either the inlet or the outlet.

Referring next to conservation of energy, for a generic component, the conservation of energy expression (Equation 3) above simplifies to:

$$w_{out} h_{out} - w_{in} h_{in} = Q_{eng} \qquad \text{(Equation 6)}$$

where $Q_{eng}$ is component-dependent. Generally speaking, $Q_{eng}$ depends on component characteristics (e.g., whether a the component is a pump or a heat exchanger). Thus, the form of $Q_{eng}$ in each physics-based model varies depending what component the physics-based model describes.

For example, for a counterflow heat exchanger, such as the heat exchanger 300, the total heat transfer rate $Q_{eng}$ is related to the inlet and outlet enthalpies on each side by:

$$Q_{eng} = w^h(h_{in}^h - h_{out}^h) = w^c(h_{out}^c - h_{in}^c) \qquad \text{(Equation 7)}$$

where the enthalpies $h_{in}^h$, $h_{in}^c$, $h_{out}^h$, and $h_{out}^c$ can be calculated from the corresponding temperature sensor given the operating pressure. In addition, $Q_{eng}$ can be defined via the log-mean temperature difference (LMTD) model:

$$Q_{eng} = UA \frac{\Delta T_o - \Delta T_i}{\ln \frac{\Delta T_o}{\Delta T_i}} \qquad \text{(Equation 8)}$$

where $\Delta T_o = T_{out}^h - T_{in}^c$ and $\Delta T_i = T_{in}^h - T_{out}^c$. In Equation 8, U refers to an overall heat transfer coefficient of the heat exchanger and A refers to the effective heat transfer area. Because A is a constant, the variables U and A are combined and referred to in this disclosure as a single parameter, UA, referred to for the remainder of the disclosure for brevity as the overall heat transfer coefficient.

An example physics-based model based on conservation of energy (i.e., Equation 6) for a counterflow heat exchanger includes a parametric model for UA:

$$\frac{1}{UA} = \theta_h w_h^{-0.8} + \theta_c w_c^{-0.8} + \theta_0 \qquad \text{(Equation 9)}$$

where $\theta_0$, $\theta_h$, and $\theta_c$ are parameters capturing physical constants and geometric characteristics of the heat exchanger. The values of these parameters, for different heat exchangers, are calculated during the model calibration phase discussed below. The functional form of Equation 9 (i.e., the exponents of $w_h$ and $w_c$) originates from known physics-based heat transfer equations for a heat exchanger The physics-based model also includes Equations 7 and 8 above, which are used to calculate UA. Calibration and subsequent use of this model requires at least six sensors to measure: $w^c$, $w^h$, $T_{in}^c$, $T_{out}^c$, $T_{in}^h$, and $T_{out}^h$, Using the procedure outlined above, physics-based models can be constructed for components of any type. The physics-based models can be expressed as functions of parameters (i.e., the physics-based models may be parametric models) that are calculated during the model calibration process described below.

Further, to determine which physics-based model can be calibrated for each component, the fault diagnosis device 102 can evaluate which physical sensors are available for the component. Sensor measurements are used to evaluate residuals for the physics-based model (i.e., differences between values predicted by the physics-based model and measurements), and are also used to calibrate the physics-based model. Thus, to construct and utilize the physics-based model, there must be sufficient sensors to evaluate the residuals and to calibrate the physics-based model. For example, in the case of the heat exchanger 300, there are not flow rate sensors at both the inlet 307 and outlet 308 of the inner (hot) tube 302, nor are there flow rate sensors at both the inlet 304 and the outlet 305 of the outer (cold) tube 301. Instead, there is a single flow rate sensor 311 for the outer tube 301, and a single flow rate sensor 314 for the inner tube 302. As a result, a physics-based model for conservation of mass would not be suitable to analyze the heat exchanger 300 (unless a systems-approach is utilized, as described below beginning with FIG. 6). Likewise, a physics-based model for conservation of momentum would also not be possible because there are no pressure sensors for the heat exchanger 300. Accordingly, a suitable model for the physics-based model for the heat exchanger 300 would correspond to the physics-based model determined using conservation of energy because the sensors 311-316 permit calibration of the physics-based model.

After initially constructing a physics-based model for a component, the fault diagnosis device 102 may store the physics-based model in the model library 124. The fault diagnosis device 102 may also indicate what sensors are required to calibrate the physics-based model, and for which type of component (e.g., a counterflow heat exchanger) the physics-based model applies. The model library 124 therefore can store the physics-based models applicable for each generic type of component. Accordingly, in some implementations, the fault diagnosis device 102 may construct the physics-based models for the component by retrieving previously-constructed generic physics-based models stored in the model library 124. The fault diagnosis device 102 can then calibrate the retrieved, generic physics-based models using historical sensor measurements of the particular component, as described below (block 206). Further, the fault diagnosis device 102 can modify generic physics-based models for the component to conform to the component description received at block 202.

For example, the model library 124 may store the generic physics-based model for UA for a heat exchanger (Equation 9), including the unknown parameters. The fault diagnosis device 102 can receive a component description of a particular heat exchanger, identify the component as a heat exchanger based on the component description, and retrieve the generic physics-based model for UA from the model library 124. The fault diagnosis device can then calculate the unknown parameters of the physics-based model using historical sensor measurements of the particular heat exchanger, thereby calibrating the physics-based model for the particular heat exchanger. As another example, the model library 124 may store a generic physics-based model for conservation of mass (e.g., Equation 4). For a particular component, the fault diagnosis device 102 may retrieve the generic physics-based model and modify the generic physics-based model in accordance with the connections indicated by the description of the particular component.

After constructing one or more physics-based models for the component, the fault diagnosis device 102 calibrates the physics-based models (block 206). To calibrate the physics-based models, the fault diagnosis device 102 fits the physics-based models 110 against historical sensor measurements of the component to calculate the unknown parameters (e.g., $\theta_0$, $\theta_1$, $\theta_2$, $\theta_h$, and $\theta_c$ above). The fault diagnosis device 102 can retrieve the historical sensor measurements from the calibration database 120, for example. The fault diagnosis device 102 can use any fitting technique that is appropriate for the form of the physics-based model, such as linear or polynomial regression. For example, the fault diagnosis device 102 can utilize the method of least squares to calculate the unknown parameters. The historical measurements may be captured by sensors of the component while the thermal hydraulic system 140 is operating without faults. Alternatively, the historical measurements may be captured by sensors of the component during any historical reference period that is to be compared to real-time measurements.

During calibration, depending on the regression technique utilized, standard errors (i.e., standard deviations and variances) for the calculated unknown parameters can be estimated. These estimated errors can later be utilized to quantify the uncertainty in a residual, as will be discussed in further detail below.

By calibrating the physics-based models, the fault diagnosis device 102 produces calibrated models that are specific to the particular component and the particular system in which the particular component operates. After the unknown parameters are calculated, the calibrated models capture geometric characteristics, design characteristics, and any other idiosyncrasies associated with the particular component and the particular system. The calibration process allows the system to tune physics-based models, which are applicable to generic components, to the particular components operating in the particular system of interest. As a result, the calibrated models capture both the underlying physics of component operation and quantitative details of the particular component and system. Further, the fault diagnosis device 102 can produce these calibrated models automatically based on a component description (e.g., a component description extracted from a P&ID) and using historical measurements, without requiring manual intervention or many system-specific details such as geometric measurements.

Before using the historical measurements to calibrate the physics-based models, the fault diagnosis device 102 may perform one of more data processing steps to prepare the historical measurements for analysis. Depending on the embodiment and/or scenario, another computing device of the system 100 may perform these data processing steps prior to transmitting the historical measurements to the fault diagnosis device 102. Further, these data processing steps, described below, can also be applied to real-time sensor data from the thermal hydraulic system 140 before calculating residuals and determining a fault diagnosis. Thus, these data processing techniques can be used to prepare any sensor data for analysis, including historical measurements or real-time sensor measurements. Example data processing steps are discussed below with reference to four example anomalies that may be present in sensor data. However, depending on the implementation and/or scenario, the fault diagnosis device 102 may perform additional or different data processing steps to prepare sensor data for analysis. For example, additional data processing steps include averaging sensor data over fixed time periods (i.e., using a moving averaging analysis), or applying a filter to remove oscillations in the sensor data.

A first example data processing step includes determining that a data point in the sensor data is due to a faulty signal or a loss of signal. For example, within the sensor data, an entry for a sensor at a given time may be recorded as "equipment failure," or "bad," rather than as a numerical sensor measurement. The fault diagnosis device 102 can detect such a data point (e.g., by searching the sensor data) and can remove the data point from the sensor data A second example data processing step includes determining that a data point in the sensor data is due to an inactive sensor. For example, within the sensor data, an entry for a sensor at a given time may be "0" or a negative value that is not physically possible for the thermal hydraulic system 140. The fault diagnosis device 102 can detect such a data point (e.g., by searching the sensor data) and can remove the data point from the sensor data.

A third example data processing step includes determining that a group of consecutive data points within a time period are repeating values (e.g., because the signal from a sensor is not received correctly). The fault diagnosis device 102 can detect such an anomaly within sensor data by, for example, detecting a change in the variance of the sensor data during a time period, and can remove the data points within the time period.

A fourth example data processing step includes detecting a sudden change in a sensor reading value. For example, a single data point for a sensor may jump or drop to a different value from neighboring data points (i.e., neighboring in time). As another example, data points for two or more sensors may, at the same time step, jump or drop to different values from neighboring data points. The fault diagnosis device 102 can detect such anomalies within a group of data points and remove the anomalies from the sensor data.

The fault diagnosis device 102 can then generate residual expressions (e.g., residual expressions of the residual expressions 112) based on the physics-based models (block 208). Each residual expression is used to calculate a residual (e.g., one of the residuals 113). If there are no faults of the component or the sensors of the component, then the residuals should equal zero. A non-zero residual indicates a possible fault present in the component or a sensor of the component. Further, each residual is only sensitive to certain faults, depending on whether the fault affects the variables that make up the residual expression. If a sensor fault occurs, then every residual whose calculation involves that sensor would be expected to be non-zero. If a component fault occurs, then every residual computed for the physics-based model of that component would be expected to be non-zero.

The form of the residual expressions depends on the physics-based models. From each physics-based model, there are analytical redundancy relations (ARRs). ARRs are relationships which hold true, regardless of changes in operating conditions, unless faults are present in the component. Because an ARR holds true regardless of changes in operating conditions, the fault diagnosis techniques of this disclosure that rely on ARRs are robust to changes in operating conditions. For example, in practice, thermal hydraulic systems may enter different operating modes, such as flexible power modes. The ARRs developed from the physics-based models accurately describe system operation throughout these different operating modes. As a result, residual calculation and fault diagnosis are insensitive to changes in operating conditions.

If an ARR does not hold true under given measurements, then there is a fault present in the component. The degree to which the ARR is violated is referred to as the residual. As a simple example, a generalized ARR may be: $x_{predicted} = x_{measured}$, for some x variable. If $x_{measured}$ does not equal $x_{predicted}$, the value of x predicted by a model, then there is some fault in the component that is causing the component to not function as predicted. A residual expression for this generalized ARR is $r = x_{measured} - x_{predicted}$, i.e., the residual r is equal to the difference between the two sides of the ARR equation. Thus, a non-zero residual for each ARR equation implies an inconsistency between observations and normal system behavior, meaning that at least one of the components (or sensors) involved in the calculation of the residual has a fault. For this reason, a non-zero residual is also referred to in this disclosure as a fault symptom.

For the example mass physics-based model described above (Equation 4), there is one ARR resulting in one residual expression:

$$r_{mass} = \Sigma w_{in} - \Sigma w_{out} \quad \text{(Equation 10)}$$

A non-zero $r_{mass}$ would indicate either a sensor fault or a leakage in or out of the component. Because the calculation of $r_{mass}$ depends on flow rate sensors, a non-zero $r_{mass}$ could indicate a fault of either an inlet flow rate sensor or an outlet flow rate sensor.

For the example momentum physics-based model described above (Equation 5), there is one ARR resulting in one residual expression:

$$r_p = (P_{out} - P_{in}) - (\theta_0 + \theta_1 w + \theta_2 w^2) \quad \text{(Equation 11)}$$

A non-zero $r_p$ indicates either a sensor fault or a blockage or leakage in the component. Because the calculation of $r_p$ depends on sensor readings for $P_{in}$, $P_{out}$, and w, a non-zero $r_p$ could indicate a fault in either of these three sensors.

For energy physics-based models, the available ARRs vary based on the model and the form of $Q_{eng}$. For the example energy physics-based model for the heat exchanger 300 (Equations 7-9), there are two independent ARRs:

$$w^h(h_{in}^h - h_{out}^h) = w^c(h_{out}^c - h_{in}^c) \quad \text{(Equation 12)}$$

$$\frac{1}{w^h(h_{in}^h - h_{out}^h)}\left(\frac{\Delta T_o - \Delta T_i}{\ln\frac{\Delta T_o}{\Delta T_i}}\right) = \theta_h w_h^{-0.8} + \theta_c w_c^{-0.8} + \theta_0 \quad \text{(Equation 13)}$$

Equation 13 corresponds to $1/UA_{measured} - 1/UA_{predicted}$. Each of the two ARRs involves six sensors, the sensors 311-316. If all six sensors are available, there are two residuals $r_0$ and $r_{UA}$:

$$r_0 = w^h(h_{in}^h - h_{out}^h) - w^c(h_{out}^c - h_{in}^c) \quad \text{(Equation 14)}$$

$$r_{UA} = \frac{1}{w^h(h_{in}^h - h_{out}^h)}\left(\frac{\Delta T_o - \Delta T_i}{\ln\frac{\Delta T_o}{\Delta T_i}}\right) - (\theta_h w_h^{-0.8} + \theta_c w_c^{-0.8} + \theta_0) \quad \text{(Equation 15)}$$

Due to the sensors involved, a non-zero $r_0$ could indicate a leakage of mass in or out of the component or a fault of one or the six sensors. A non-zero $r_{UA}$ could indicate a leakage fault, a fault of one or the six sensors, or a fouling fault. Fouling in a heat exchanger is the accumulation of unwanted materials on the heat-exchanging surfaces, which can affect both the heat transfer process and the momentum transfer along the axial direction of the heat exchanger.

Further, additional residuals can be calculated that will later help to detect and differentiate sensor faults. Equation 12 can be used to estimate the value of one or the six variables in terms of the other five variables. Said another way, a variable related to one sensor reading can be expressed in terms of the other five sensor readings. Thus, a residual $r_i$ can be computed using the sensor measurements from five sensors, leaving out sensor $S_i$.

For example, without utilizing the measurement of $T_{in}^c$ of the sensor 312, (also referred to as $S_2$), the cold side inlet temperature $T_{in}^c$ can be estimated using:

$$h(T_{in,predicted}^c) = h(T_{out}^c) - \frac{w^h}{w^c}h(h(T_{in}^h) - h(T_{out}^h)) \quad \text{(Equation 16)}$$

Recall that enthalpy depends on temperature. Accordingly, a residual $r_2$, computed using Equation 13 and the predicted value $T_{in,predicted}^c$ instead of the measurement $T_{in}^c$ from the sensor 312, is given by:

$$r_2 = \frac{(T_{out}^h - T_{in,predicted}^c) - (T_{in}^h - T_{out}^c)}{Q_{eng}\ln\left(\frac{T_{out}^h - T_{in,predicted}^c}{T_{in}^h - T_{out}^c}\right)} - (\theta_h w_h^{-0.8} + \theta_c w_c^{-0.8} + \theta_0) \quad \text{(Equation 17)}$$

Similar residuals can be calculated without using each one of the sensors 311-316 (i.e., the sensors $S_1$-$S_6$) (e.g., $r_1$ does not depend on the sensor $S_1$, $r_3$ does not depend on the sensor $S_3$, etc.).

Based on the example energy physics-based model, the fault diagnosis device 102 can generate eight residual expressions $r_0$, $r_{UA}$, $r_1$, $r_2$, $r_3$, $r_4$, $r_5$, and $r_6$. Non-zero values of these eight residuals indicate eight possible faults: $F_L$ (i.e., a leakage fault), $F_0$ (i.e., a fouling fault), and $F_1$, $F_2$, $F_3$, $F_4$, $F_5$, and $F_6$ (faults associated with the sensors $S_1$-$S_6$, respectively). A summary of the dependencies of each residual for the heat exchanger example is below in Table 1.

TABLE 1

Heat Exchanger Example Residuals

| Residual | Relevant Component Fault Types | Sensors Involved |
|---|---|---|
| $r_{UA}$ | Leakage, Fouling | $S_1, S_2, S_3, S_4, S_5, S_6$ |
| $r_0$ | Leakage | $S_1, S_2, S_3, S_4, S_5, S_6$ |
| $r_1$ | Leakage, Fouling | $S_2, S_3, S_4, S_5, S_6$ |
| $r_2$ | Leakage, Fouling | $S_1, S_3, S_4, S_5, S_6$ |
| $r_3$ | Leakage, Fouling | $S_1, S_2, S_4, S_5, S_6$ |
| $r_4$ | Leakage, Fouling | $S_1, S_2, S_3, S_5, S_6$ |
| $r_5$ | Leakage, Fouling | $S_1, S_2, S_3, S_4, S_6$ |
| $r_6$ | Leakage, Fouling | $S_1, S_2, S_3, S_4, S_5$ |

Referring to the table above, a non-zero residual $r_{UA}$ indicates two possible component faults: leakage or fouling, and six possible sensor faults of the sensors $S_1$-$S_6$. A non-zero residual $r_0$ indicates one possible component fault: leakage, and six possible sensor faults of the sensors $S_1$-$S_6$, and so on.

In summary, a non-zero residual is interpreted as a fault symptom, where a fault symptom is an inconsistency between a set of observations and the physics-based models that model the components and sensors under fault-free operating conditions. The goal of the fault diagnosis frameworks described below is to diagnose faults based on a set of observed fault symptoms.

Accordingly, the residuals expressions for the physics-based models of the component are evaluated using observed sensor data to generate residuals (block 210). Non-zero residuals are interpreted as fault symptoms. While historical sensor data is needed to calibrate the physics-based models at block 206, the blocks 202, 204, 206, 208 can be performed prior to receiving sensor data of the thermal hydraulic plant 140 during the time period for which faults are to be diagnosed. For example, if faults are to be diagnosed after the thermal hydraulic system 140 begins to operate at time $t_1$, then the blocks 202, 204, 206, and 208 can be performed at time prior to the time $t_1$. Sensor measurements can be gathered from the sensors 146 of the thermal hydraulic plant 140 after $t_1$, and the evaluations at block 210 can be performed using these sensor measurements.

To evaluate the residual expressions, the fault diagnosis device 102 receives sensor data from the sensors 146 of the thermal hydraulic system 140 (e.g., via the network 130). The fault diagnosis device 102 can receive the sensor data in real-time, while the thermal hydraulic system 140 is operating. Alternatively, the sensor data can be stored, and received by the fault diagnosis device 102 at a later time. In some implementations, the fault diagnosis device 102 continuously receives new sensor measurements at each time step in real time, and calculates the corresponding residuals at the time step. In other implementations, the fault diagnosis device 102 may receive periodic batches of sensor measurements over a time period. As mentioned previously with reference to the historical measurements used during calibration (block 206), the fault diagnosis device 102 may apply data processing techniques to prepare the sensor data for analysis. For example, as the fault diagnosis device 102 receives real time sensor data, the fault diagnosis device 102 can detect whether the data point, or group of data points, is one of the four example anomalies discussed above.

The fault diagnosis device 102 then calculates the residuals (e.g., the residuals 113) using the residual expressions and the sensor data. For example, by evaluating the residual expressions described above for the heat exchanger 300, the fault diagnosis device may calculate the following residuals: $(r_{UA}, r_0, r_1, r_2, r_3, r_4, r_5, r_6) = (1, 1, 1, 1, 0, 1, 1, 1)$, where "1" indicates a non-zero residual and "0" indicates a residual that is equal to zero. The sensor data may include timestamps, and the fault diagnosis device 102 may calculate residuals at several time steps. For example, at a first time, the residuals may be $(r_{UA}, r_0, r_1, r_2, r_3, r_4, r_5, r_6) = (0, 0, 0, 0, 0, 0, 0, 0)$, and at a second time, the residuals may be $(r_{UA}, r_0, r_1, r_2, r_3, r_4, r_5, r_6) = (1, 1, 1, 1, 0, 1, 1, 1)$.

Table 2 below summarizes the possible faults of the heat exchanger 300, and the associated residuals that would be non-zero or zero in the presence of each fault. A "1" in Table 2 indicates a non-zero residual, and a "0" indicates a zero residual.

TABLE 2

Possible Faults and Associated Residuals in Heat Exchanger Example, where $F_L$ indicates a leakage fault, $F_O$ indicates a fouling fault, and $F_i$ indicates a fault of sensor $S_i$

| | $F_L$ | $F_O$ | $F_1$ | $F_2$ | $F_3$ | $F_4$ | $F_5$ | $F_6$ |
|---|---|---|---|---|---|---|---|---|
| $r_{UA}$ | 1 | 1 | 1 | 1 | 1 | 1 | 1 | 1 |
| $r_0$ | 1 | 0 | 1 | 1 | 1 | 1 | 1 | 1 |
| $r_1$ | 1 | 1 | 0 | 1 | 1 | 1 | 1 | 1 |
| $r_2$ | 1 | 1 | 1 | 0 | 1 | 1 | 1 | 1 |
| $r_3$ | 1 | 1 | 1 | 1 | 0 | 1 | 1 | 1 |
| $r_4$ | 1 | 1 | 1 | 1 | 1 | 0 | 1 | 1 |
| $r_5$ | 1 | 1 | 1 | 1 | 1 | 1 | 0 | 1 |
| $r_6$ | 1 | 1 | 1 | 1 | 1 | 1 | 1 | 0 |

In some implementations, the method 200 continues after block 210 with block 214, in which a diagnosis framework is used to identify faults based on the calculated residuals. In other implementations, the method 200 includes the fault diagnosis device 102 determining whether residuals are statistically non-zero (block 212). Block 212 can also be considered part of block 210, as it is an additional step taken to determine whether an evaluated residual should be considered non-zero or zero.

Block 212 is one way in which the techniques of this disclosure can be used to account for uncertainty during fault diagnosis. In theory, any residual that is not precisely equal to zero may be classified as non-zero. However, in practical applications, uncertainty can lead to residuals that are "noisy." Said another way, the value of the residuals may be approximately zero but not exactly zero.

Sources of uncertainty include both measurement uncertainty and modeling uncertainty. Measurement uncertainty results from the uncertainty in the reading value of each sensor. Modeling uncertainty can arise because the physics-based models may simplify some of the underlying physics and thus not describe physical phenomena with complete accuracy. Further, there may be uncertainty in the measurements used to calibrate the physics-based models, which can also introduce model uncertainty.

One way in which the fault diagnosis device 102 can account for uncertainty is by applying statistical techniques when evaluating residuals. Accordingly, the fault diagnosis device 102 determines whether the calculated residuals are statistically non-zero (block 212). In particular, the fault diagnosis device 102 can utilize statistical change detection methods to detect statistically non-zero residuals. A statistically non-zero residual serves as a fault symptom. A residual is statistically non-zero (i.e., observed to be non-zero) when the mean value of the residual deviates from its normal value (i.e., changes from zero to non-zero). Another way in which the fault diagnosis device 102 can account for uncertainty is to use a probabilistic fault diagnosis framework, which will be discussed in reference to block 214 and FIG. 5.

In some implementations, to apply these statistical techniques, the fault diagnosis device 102 quantifies the uncertainty in each residual. Because a residual depends on both model predictions and sensor measurements, the uncertainty of a residual depends on the uncertainty of model predictions and the uncertainty of the sensor measurements. The uncertainty of the sensor measurements can be estimated based on historical sensor measurements. The uncertainty of model predictions can be estimated by quantifying the uncertainty of the unknown parameters of the physics-based models calculated during the calibration phase. During the calibration phase, the standard error of the calculated parameters can be estimated.

Further, the fault diagnosis device 102 can also quantify the mean of a residual. Theoretically, the mean of a residual should be zero. Measurement uncertainty caused by signal noise and uncertainty in the calculated model parameters generally have zero mean. However, modeling uncertainty, caused by the parametric model being an approximation of the underlying physics, can introduce a model bias that causes a residual to have a non-zero mean. This model bias may be vary depending on operating conditions of the thermal hydraulic system. The fault diagnosis device 102 can quantify this model bias as the variance of the residual mean value, as calculated using historical measurements of the thermal hydraulic system at different operating conditions. The model bias can then be used to estimate upper and lower bounds (i.e., a confidence interval) of a residual mean value. This confidence interval can then be used to set the sensitivity of a statistical change detection method (i.e., how far a residual mean value must shift from the mean to be considered a statistical change).

In addition, the selected sensitivity of a statistical change detection method can also depend on how sensitive a residual is to given faults. For each residual, the relevant faults are those that can lead to changes in the mean value of the residual. To set the sensitivity of a statistical change detection method, the fault diagnosis device 102 can perform a sensitivity analysis to estimate the expected magnitude of the change in the residual mean value when one or multiple relevant faults occur. To perform the sensitivity analysis, the fault diagnosis device 102 may quantify how the residual mean value is affected when each relevant fault occurs (e.g., using historical sensor measurements).

Example statistical change detection methods (also referred to as statistical change detection algorithms) which can be used to determine whether the mean value of the residual, over time, is statistically non-zero include the limit-checking method (also referred to as the Shewhart control chart), exponentially-weighted moving average (EWMA) control chart, the generalized likelihood ratio (GLR) test, and Bayesian change detection algorithms.

For example, using the GLR test, a GLR decision function is evaluated at each time step. The GLR decision function takes as input past values of the residual and detects a change (i.e., a shift in mean value) when the GLR decision function exceeds a predetermined detection threshold. The detection threshold can be defined based on a tolerable false detection rate for the specific application. In particular, increasing the detection threshold reduces the rate of false positives (i.e. scenarios in which a residual is evaluated as non-zero but there is no fault present), but increases the possibility of false negatives (i.e. scenarios in which a residual is evaluated as zero but there is a fault present). The detection threshold can therefore be adjusted depending on the desired sensitivity.

An example GLR decision function for a noisy variable y (i.e., a residual) that can be described by a Gaussian distribution with a known mean $\mu_0$ and standard deviation $\sigma_0$ is:

$$g_k = \frac{1}{2\sigma_0^2} \max_{1 \leq j < k} \frac{1}{k-j+1} \left[ \sum_{i=j}^{k} (y_i - \mu_0) \right]^2 \qquad \text{(Equation 18)}$$

where $g_k$ is the value of the decision function at time step k. If a change is detected, the location of the change is the index j that maximizes the above expression. For a given application, the mean $\mu_0$ and standard deviation $\sigma_0$ of a residual can be estimated based on historical sensor data or sensor data otherwise captured during a fault-free scenario.

In scenarios where the GLR decision function is used to detect a small drift rather than an abrupt shift, such as in cases where the fault diagnosis device 102 is monitoring for small degradations over time, the GLR decision function may be:

$$g_k = \frac{1}{2\sigma_0^2} \max_{1 \leq j < k} \frac{\left[ \sum_{i=j}^{k} (i-j)(y_i - \mu_0) \right]^2}{\sum_{i=j}^{k} (i-j)^2} \qquad \text{(Equation 19)}$$

where the above GLR decision function is referred to as a GLR-D decision function.

In some implementations, the fault diagnosis device 102 may apply a statistical change detection method modified based on the sensitivity of the residual to each of its relevant faults, and/or based on the model bias discussed above. For example, based on the sensitivity analysis and model bias, the fault diagnosis device may determine that a residual should be considered to be zero if the mean value of the residual is within a sensitivity parameter $\Delta\mu$ of the mean $\mu_0$ (where the mean $\mu_0$ is the mean expected for the residual during fault-free operation, which can be calculated from historical measurements). The fault diagnosis device 102 can incorporate this sensitivity parameter $\Delta\mu$ into the decision function of the change detection method.

For example, the fault diagnosis device 102 can modify the GLR decision function (Equation 18) to incorporate the sensitivity parameter $\Delta\mu$. Given a set of observations $\{y_i\}$, for time steps $1 \leq i \leq N$, where $y_i$ can correspond to a residual at time step i, the maximum likelihood estimation of the mean is:

$$\hat{\mu} = \frac{1}{N} \sum_{i=1}^{N} y_i \qquad \text{(Equation 20)}$$

A parameter $\widehat{\mu_0}$ can be defined that depends on the value of $\hat{\mu}$:

If $|\hat{\mu} - \mu_0| \leq \Delta\mu$: $\widehat{\mu_0} = \hat{\mu}$

If $\hat{\mu} > \mu_0 + \Delta\mu$: $\widehat{\mu_0} = \mu_0 + \Delta\mu$

If $\hat{\mu} < \mu_0 - \Delta\mu$: $\widehat{\mu_0} = \mu_0 - \Delta\mu$ \qquad (Equation 21)

The fault diagnosis device 102 can then use a modified GLR decision function:

$$g_k = \frac{1}{2\sigma_0^2} \max_{k-m+1 \leq j < k} \frac{1}{k-j+1} \left[ \sum_{i=j}^{k} (y_i - \hat{\mu}_0) \right]^2 \qquad \text{(Equation 22)}$$

where m denotes the number of past data points for the calculation, and with $\hat{\mu}_0$ computed for the data points between time step j to k.

Figure 4A:
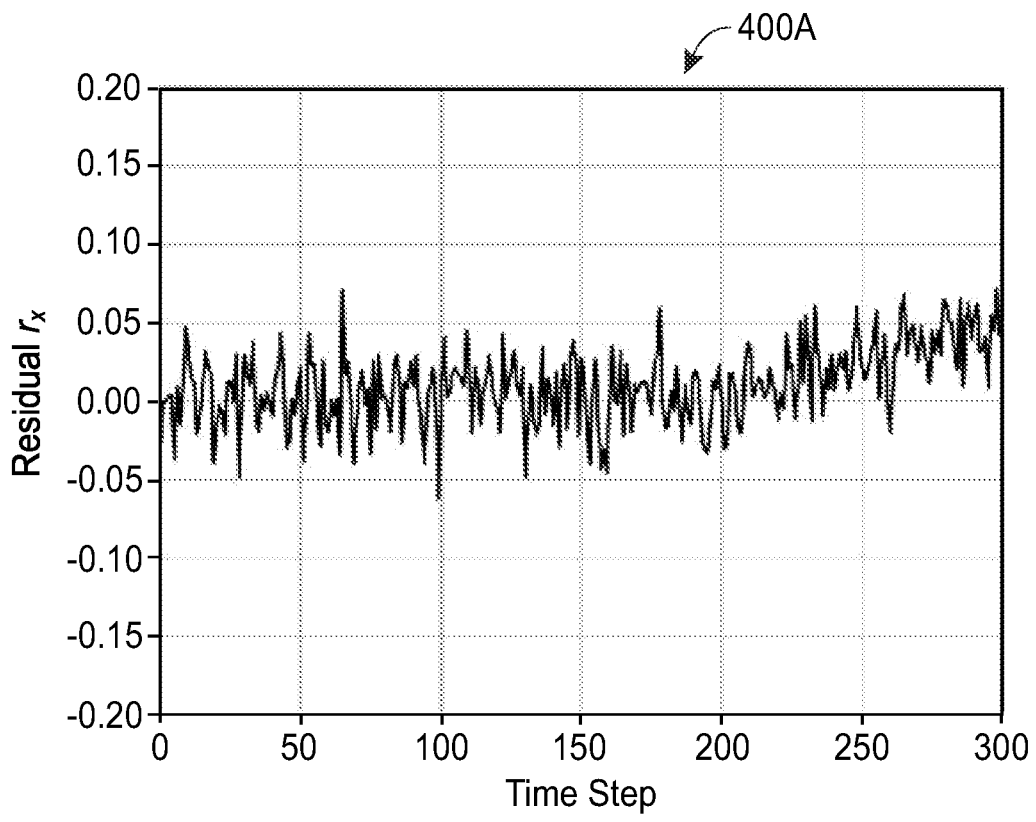
FIG. 4A is an example graph illustrating a residual as a function of time.
Figure 4B:
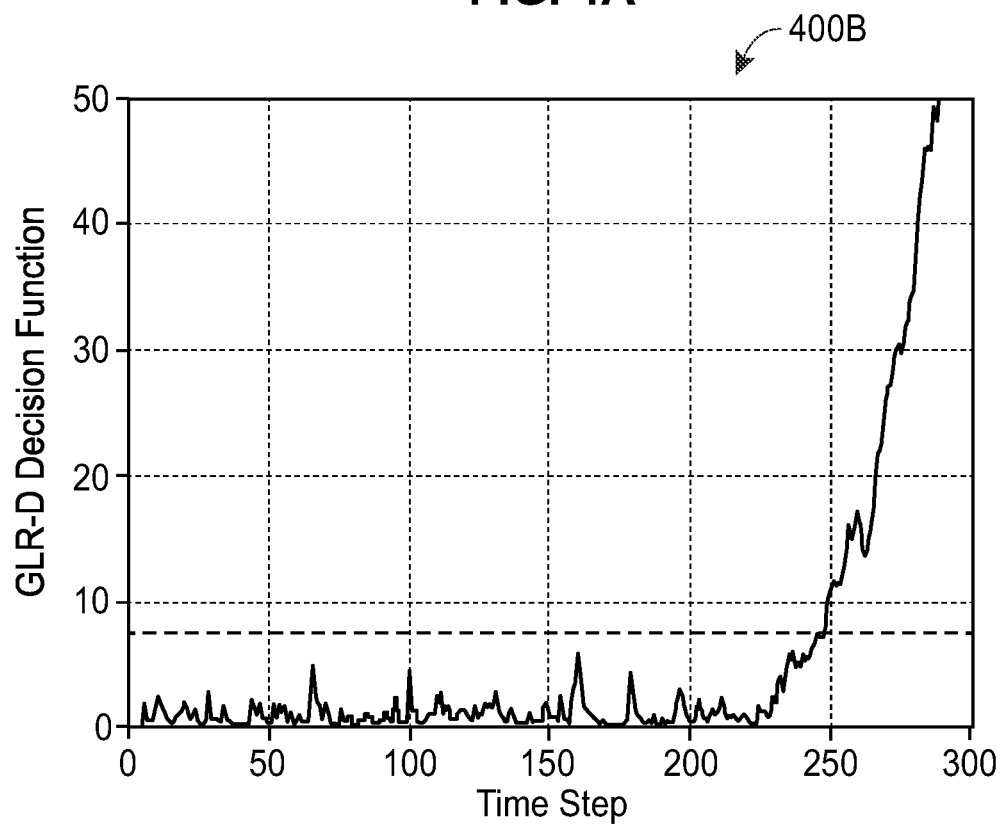
FIG. 4B is an example graph illustrating a decision function as a function of time, where the decision function is used to detect when a residual is statistically non-zero.

Turning briefly to FIGS. 4A-4B, example graphs 400A and 400B, respectively, illustrate an example noisy residual $r_x$ and an example GLR-D decision function for the residual $r_x$ as functions of time. As illustrated in FIG. 4A, the residual $r_x$ is near zero (generally <|0.05|), but varies between different values at different time steps. Looking at FIG. 4A, the slight shift in the mean value of the residual $r_x$ away from zero can be seen starting around time step 245. This shift may represent, for example, a sensor drifting out of calibration. Further, this shift is reflected in the GLR-D decision function values plotted in FIG. 4B. From time steps 1 to approximately 245, the GLR-D decision function is below the detection threshold, illustrated by the dashed horizontal line. Accordingly, the fault diagnosis device 102 at block 212 would interpret the residual $r_x$ as statistically zero, even though at some time steps the residual $r_x$ is not exactly zero. However, after approximately time step 245, the GLR-D decision function is above the detection threshold. Accordingly, the fault diagnosis device 102 at block 212 would interpret the residual $r_x$ as statistically non-zero after the time step 245.

It should be understood that while this disclosure discusses the GLR test, the GLR test is merely an example statistical change detection method. The fault diagnosis device 102 can utilize any suitable statistical change detection technique to detect statistically non-zero residuals.

Thus, the fault diagnosis device 102 evaluates the residual expressions at block 210 to generate the residuals, and may adjust these residuals at block 212 such that the final residuals reflect whether the residuals are statistically zero or non-zero. Next, the fault diagnosis device 102 applies a diagnosis framework to identify faults based on residuals (block 214). After identifying the faults (or sets of possible faults), the fault diagnosis device 102 can output the results of the diagnosis framework (e.g., by displaying the results on the user interface 118 of the fault diagnosis device 102 or by transmitting the results to another computing device via the network 130 for display or other form of presentation).

It should be noted that the fault diagnosis device 102 can receive sensor data from the thermal hydraulic system 140 describing operation of the system at different time steps. For each time step, the fault diagnosis device can calculate and store residuals (block 210), detect whether the residuals are statistically non-zero (block 212), and apply a fault diagnosis framework to identify faults occurring at that time step (block 214).

The fault diagnosis device 102 can apply different diagnosis frameworks to identify the faults. This disclosure will describe three example diagnostic frameworks: a model-based diagnosis (MBD) framework, a fault detection and isolation (FDI) framework, and a probabilistic fault diagnosis framework. However, other diagnosis frameworks than those described here could be used in combination with any of the steps 202-212 described above.

Before discussing each of these three example diagnosis frameworks, it is helpful to introduce some fault diagnosis terminology. As discussed above, a non-zero residual is a fault symptom. The presence of one or more fault symptoms indicates that one or more faults is present and causing the component to deviate from normal behavior. A fault diagnosis is a hypothesis that a set of one or more faults have occurred. Generally speaking, a fault diagnosis framework is used to obtain all fault diagnoses whose sets of faults are consistent with the observed fault symptoms. An example diagnosis is $[F_1, F_2]$, where the square brackets indicate that faults $F_1$ and $F_2$ have occurred. Depending on the scenario and the diagnostic framework utilized, there may be more than one diagnosis that is consistent with the observed fault symptoms. A diagnosis that is consistent with observed fault symptoms is referred to as a valid diagnosis. Thus, there may be more than one valid diagnosis, even though there is only one diagnosis that matches the actual state of the system of component. For example, a diagnosis framework may provide two possible fault diagnoses: (1) $[F_1]$ and (2) $[F_2]$, but be unable to determine whether diagnosis (1) or diagnosis (2) corresponds to the actual, physical faults.

To narrow down a list of possible fault diagnoses, a fault diagnosis framework may employ the concept of "minimal diagnosis," and retain only "minimal diagnoses" in the final diagnostic result. A minimal diagnosis is one in which no fault of the set of faults can be removed for the diagnosis to remain valid. For example, in a scenario, a fault diagnosis framework may identify three possible diagnoses based on a set of residuals: a first diagnosis $[F_1, F_2]$, a second diagnosis $[F_1, F_2, F_3]$, and a third diagnosis $[F_1, F_2, F_3, F_4]$. $F_4$ can be removed from the third diagnosis and the resultant diagnosis is still valid because the resultant diagnosis corresponds to the second diagnosis. Similarly, $F_3$ can be removed the second diagnosis and the resultant diagnosis is still valid because the resultant diagnosis corresponds to the first diagnosis. However, if any fault is removed from the first diagnosis, the resultant diagnosis would no longer be valid. There, the first diagnosis is a minimal diagnosis.

Further, fault diagnosis frameworks also may use the term "conflict." Each fault symptom implies that at least one of the involved sensors or components must be faulty. Mathematically, a "conflict" for a set of faults is the statement that at least one of the faults in the set must have occurred. For example, if a residual that involves a first sensor and a second sensor is non-zero, then fault $F_1$ (a fault of the first sensor) and/or fault $F_2$ (a fault of the second sensor) is present. Such a conflict is indicated using angled brackets as: $<F_1, F_2>$. A conflict is valid if a set of observed fault symptoms cannot be explained without at least one fault in the conflict. Similar to a minimal diagnosis, a "minimal conflict" is a valid conflict such that none of its subsets is also a valid conflict. For example, based on a set of fault symptoms, it must be true that at least one fault of $F_1$, $F_2$, and $F_3$ is present. A valid conflict is therefore $<F_1, F_2, F_3>$. While conflict is $<F_1, F_2, F_3, F_4>$ is also a valid conflict, it is not a minimal conflict.

A diagnostic framework may aim to determine a set of minimal conflicts from observed fault symptoms, and determine all minimal diagnoses from the set of minimal conflicts. However, not all diagnostic frameworks require or make use of minimal conflicts and/or minimal diagnoses.

Turning back to the techniques of this disclosure, a first example diagnosis framework that the fault diagnosis device 102 can apply at block 214 is an MBD framework. In the MBD framework, only non-zero residuals are utilized as fault symptoms to formulate a list of conflicts. In some implementations, the MBD framework further reduces the list of conflicts to a list of minimal conflicts. Zero residuals are ignored by the MBD framework. The MBD framework then determines fault diagnoses from the conflicts. In some implementations, the MBD framework determines minimal diagnoses from the conflicts or minimal conflicts.

For example, for the heat exchanger 300, the fault diagnosis device 102 determines based on blocks 210 and 212 that the residuals at a given time are: $(r_{UA}, r_0, r_1, r_2, r_3, r_4, r_5, r_6) = (1, 1, 1, 1, 0, 1, 1, 1)$. The fault diagnosis device 102 ignores the zero residual $r_3$ and determines seven conflicts from the non-zero residuals, shown in Table 3 below.

TABLE 3

Conflicts using MBD framework in a scenario
with residuals (1, 1, 1, 1, 0, 1, 1, 1)

| Residual | Conflict |
| --- | --- |
| $r_{UA} \neq 0$ | $<F_L, F_0, F_1, F_2, F_3, F_4, F_5, F_6>$ |
| $r_0 \neq 0$ | $<F_L, F_1, F_2, F_3, F_4, F_5, F_6>$ |
| $r_1 \neq 0$ | $<F_L, F_0, F_2, F_3, F_4, F_5, F_6>$ |
| $r_2 \neq 0$ | $<F_L, F_0, F_1, F_3, F_4, F_5, F_6>$ |
| $r_4 \neq 0$ | $<F_L, F_0, F_1, F_2, F_3, F_5, F_6>$ |
| $r_5 \neq 0$ | $<F_L, F_0, F_1, F_2, F_3, F_4, F_6>$ |
| $r_6 \neq 0$ | $<F_L, F_0, F_1, F_2, F_3, F_4, F_5>$ |

The conflict for $r_{UA}$ is not a minimal conflict because each of the other six conflicts is a subset of this conflict. However, the fault diagnosis device 102 may still consider the non-minimal conflict because it serves as an additional observation of the thermal hydraulic system 140.

A diagnosis is valid if and only if it can satisfy all seven of the conflicts in Table 3. Valid minimal diagnoses are those sets of faults such that there is at least one element of the set of faults in each conflict. Accordingly, the list of all valid minimal diagnoses is: [$F_L$] or [$F_3$] or [$F_i$, $F_j$] for any i, j≠L, 3. Any combination of two or more faults is also a valid diagnosis, but would not be a minimal diagnosis because it would contain one of these other 17 diagnoses. While in other example scenarios the MBD framework considers all valid diagnoses, the MBD framework in this scenario considers only minimal diagnoses.

Thus, in this scenario, applying the MBD framework, the fault diagnosis device 102 would generate two single-fault diagnoses [$F_L$] and [$F_3$] and 15 two-fault diagnoses ([$F_i$, $F_j$] for any i, j≠L, 3). The fault diagnosis device 102 may report this final diagnostic result (e.g., by displaying the results on the user interface 118 of the fault diagnosis device 102 or by transmitting the results to another computing device via the network 130 for display or other form of presentation).

Mathematically, these 17 diagnoses are equally valid. In some implementations, the fault diagnosis device 102 can further narrow this list down by taking into account the prior probability of each fault. For instance, if all eight faults each have the same small probability, then multiple-fault events may be considered by the fault diagnosis device 102 as significantly less likely than single fault events. Thus, the fault diagnosis device 102 may report the single-fault diagnoses and omit the two-fault diagnoses as the final diagnostic result. The prior probabilities of the possible faults may be provided to the fault diagnosis device 102 and stored at the memory 106, and/or estimated by the fault diagnosis device 102 based on historical measurements of the thermal hydraulic system 140.

A second example diagnosis framework is an FDI framework. In the FDI framework, non-zero residuals are also utilized as fault symptoms. However, zero residuals are not ignored. Rather, zero residuals are used to exonerate the involved components and sensors. For example, if a residual that is calculated using a sensor is zero, then the FDI framework exonerates the sensor and presumes that the sensor is not faulty. Relevant faults from zero residuals are therefore removed from the observed conflicts. After obtaining conflicts (all conflicts or minimal conflicts) from non-zero residuals and exonerating faults using zero residuals, the FDI framework obtains diagnoses (all valid diagnoses or minimal diagnoses) from the conflicts.

Referring back to the heat exchanger example and the residuals $r_{UA}$, $r_0$, $r_1$, $r_2$, $r_3$, $r_4$, $r_5$, $r_6$)=(1, 1, 1, 1, 0, 1, 1, 1), applying the FDI framework results in the conflicts shown in Table 4. In contrast to the MBD framework, the FDI framework uses the zero residual $r_3$ to exonerate involved component faults and sensors from consideration. In this scenario, because $r_3=0$, the FDI framework presumes that the fault cannot be $F_L$, $F_0$, $F_1$, $F_2$, $F_4$, $F_5$, or $F_6$.

TABLE 4

Conflicts using FDI framework in a
scenario with residuals (1, 1, 1, 1, 0, 1, 1, 1)

| Residual | Conflict | Reduced Conflicts after Exoneration due to $r_3 = 0$ |
| --- | --- | --- |
| $r_{UA} \neq 0$ | $<F_L, F_0, F_1, F_2, F_3, F_4, F_5, F_6>$ | $<F_3>$ |
| $r_0 \neq 0$ | $<F_L, F_1, F_2, F_3, F_4, F_5, F_6>$ | $<F_3>$ |
| $r_1 \neq 0$ | $<F_L, F_0, F_2, F_3, F_4, F_5, F_6>$ | $<F_3>$ |
| $r_2 \neq 0$ | $<F_L, F_0, F_1, F_3, F_4, F_5, F_6>$ | $<F_3>$ |
| $r_4 \neq 0$ | $<F_L, F_0, F_1, F_2, F_3, F_5, F_6>$ | $<F_3>$ |
| $r_5 \neq 0$ | $<F_L, F_0, F_1, F_2, F_3, F_4, F_6>$ | $<F_3>$ |
| $r_6 \neq 0$ | $<F_L, F_0, F_1, F_2, F_3, F_4, F_5>$ | $<F_3>$ |

Thus, applying the FDI framework, the fault diagnosis device 102 would identify only [$F_3$] as the fault diagnosis. The fault diagnosis device 102 may report this final diagnostic result.

A third example diagnosis framework is a probabilistic diagnosis framework. As discussed above with respect to block 212, uncertainty can affect the values of residuals, and thus lead to uncertainty in the observed fault symptoms. One way the fault diagnosis device 102 accounts for this uncertainty is by determining whether residuals are non-zero statistically (block 212). Additionally or alternatively, the fault diagnosis device 102 can account for uncertainty using a probabilistic diagnosis framework.

The statistical change detection methods discussed with reference to block 212 reduce the probability of a false positive. However, in some scenarios, high uncertainty may lead to noise with large amplitudes. If a detection threshold of a statistical change detection method is set high enough to avoid these large amplitude noises from causing false positives, the rate of false negatives may be increased. Due to false negatives, actual non-zero residuals may be incorrectly detected as zero. A high rate of false negatives is particularly problematic if using an FDI framework, as incorrect zero residuals cause faults to be incorrectly exonerated. A probabilistic diagnosis framework takes into account the possibility of both false negatives and false positives.

In a probabilistic diagnosis framework, prior probabilities of each fault (i.e., how likely is it that the fault occurs) and the probabilities of false observations are incorporated into the reasoning process. Using these probabilities, the probabilistic diagnosis framework determines the posterior probability of a fault (i.e., the probability that a fault is present given the observed zero and non-zero residuals).

Posterior probabilities of the faults may be calculated using a Bayesian network method. Using Bayes' theorem, the relation between the posterior probability and the prior probability of a fault can be written as:

$$P(F_i|O) = \frac{P(O|F_i) \times P(F_i)}{P(O)} \quad \text{(Equation 23)}$$

where O is the set of all available observations (i.e., the set of observed zero and non-zero residuals, where an observation can correspond to the output of a statistical change detection method), $P(F_i)$ is the prior probability of the fault (i.e., how likely it is for the fault to occur), $P(O|F_i)$ is likelihood of the observations (i.e., the probability to have observations O if fault $F_i$ occurs), and $P(O)$ is the marginal probability of the observations O regardless of whether the fault $F_i$ is present, and $P(F_i|O)$ is posterior probability of the fault $F_i$ given the observations O.

To generalize Equation 23 to determine the posterior probabilities of multiple-fault scenarios given a set of observations, the probabilistic fault diagnosis framework uses a Bayesian network to compute the likelihood and marginal probability of the observations. Generally speaking, a Bayesian network is a directed acyclic graph whose nodes represent random variables and directed edges represent conditional dependent relations. A Bayesian network of the probabilistic fault diagnosis framework has three layers of nodes: (1) possible faults for the component or system, (2) all residuals (i.e., the true mean value of the residual), and (3) the observation made for each residual (i.e., whether the residual is classified as zero or non-zero, such as by a statistical change detection method).

Figure 5:
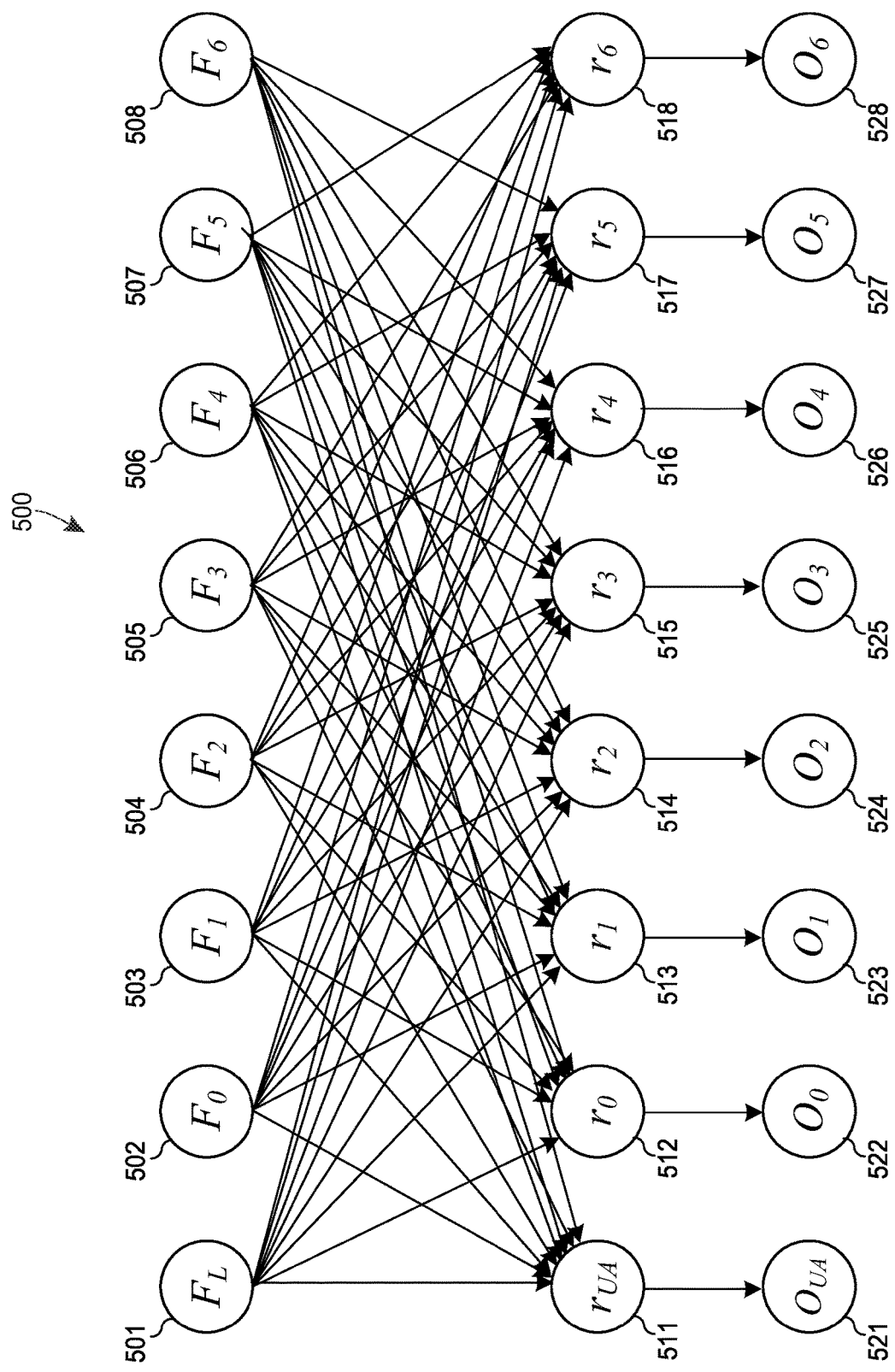
FIG. 5 is an example Bayesian network for a probabilistic diagnosis framework.

FIG. 5 illustrates an example Bayesian network 500 for an example scenario involving the heat exchanger 300. The nodes of the Bayesian network 500 are illustrated by circles, and the directed edges are represented by arrows. The first layer of the Bayesian network 500 includes the nodes 501-508, which correspond to the faults $F_L$, $F_0$, $F_1$, $F_2$, $F_3$, $F_4$, $F_5$, $F_6$, respectively. The second layer of the Bayesian network 500 includes the nodes 511-518, which correspond to the residuals $r_{UA}$, $r_0$, $r_1$, $r_2$, $r_3$, $r_4$, $r_5$, $r_6$, respectively. The third layer includes the nodes 521-528, which correspond to the observations of the residuals $O_{UA}$, $O_0$, $O_1$, $O_2$, $O_3$, $O_4$, $O_5$, $O_6$. The difference between the second layer and the third layer is that the second layer corresponds to the actual mean values of the residuals, whereas the third layer corresponds to whether the residual is detected to be zero or non-zero (e.g., based on a change detection method). Said another way, the third layer corresponds to the output of the change detection method.

The structure of the Bayesian network 500 reflects the causality relations between the faults, residuals, and observations. For example, because the value of $r_{UA}$ can be affected by the presence of any one of the eight faults $F_{UA}$-$F_6$, there are arrows connecting $r_{UA}$ (node 511) to each fault (nodes 501-508). However, the presence of fault $F_0$ does not affect the value of $r_0$, so there is no arrow between the fault $F_0$ (node 502) and the residual $r_0$ (node 512).

To define the Bayesian network 500, the fault diagnosis device 102 specifies the conditional probability distribution at each node. For the purposes of this example, the faults and residuals can be considered binary variables rather than continuous variables. However, the probabilistic diagnosis framework described via this example can also be utilized with continuous probability functions. Using the binary variable approach, a fault has the value "1" if the fault has occurred and "0" if the fault has not occurred. A residual has the value "1" if the true mean value of the residual is non-zero, and "0" otherwise. In some implementations, the fault diagnosis device 102 can discretize the residuals based on the sensitivity parameter. For example, the residual can be considered "0" if the mean value is between $\mu_0 \pm \Delta\mu$, and "1" otherwise.

To define the first layer, the fault diagnosis device 102 obtains and/or calculates the prior probabilities of each fault. As mentioned previously with reference to the MBD diagnosis framework, prior probabilities can be provided to the fault diagnosis device 102 or estimated by the fault diagnosis device based on historical measurements. For example, if the probability of fouling is 10%, the probability of leakage is 1%, and the probability of a sensor being faulty or out of calibration is 5%, then: $P(F_0=1)=0.1$, $P(F_L=1)=0.01$, and $P(F_i=1)=0.05$ for i=1-6.

The conditional dependence of each residual on each of its 'parent' faults (i.e., first layer nodes connected to the residual by an arrow), can be estimated by analyzing the physics-based model(s) for the component. More particularly, the conditional probability of each residual on its parent fault depends on the sensitivity of the underlying physics-based model to each fault. Furthermore, in multiple-fault scenarios, it is possible that faults can counteract one another. Generally speaking, the conditional probability distribution of each residual can be computed by sampling the underlying physics-based model. This particular example assumes that a residual is non-zero if at least one of its parent nodes has a value of 1. Accordingly, $P(r_i=0|\text{all parent nodes}=0)=1.0$, and $P(r_i=1|\text{any parent node}=1)=1.0$.

The conditional dependence of each observation $O_i$ on the true mean value of the residual $r_i$ depends on the false positive and false negative rates of the change detection method used. The false positive and negative rates depend on the specific change detection algorithm (e.g., which statistical change detection algorithm is used at block 212) and the selected detection threshold. The fault diagnosis device 102 can estimate false positive and false negative rates for a given detection threshold and statistical change detection algorithm, or receive such false positive and false negative rates. For example, the fault diagnosis device 102 can estimate the false rates based on the rates of false negatives and positives detected for historical sensor measurements or simulated sensor measurements. This particular example assumes that the false positive rate is 0.1% and the false negative rate is 1%. Thus, $P(O_i=1|r_i=0)=0.001$ and $P(O_i=1|r_i=0)=0.01$.

In some implementations, the first layer of nodes (i.e., nodes 501-508), also includes at least one additional node, referred to herein as an event node. The event node corresponds to an event, which may be a change in operating conditions or another external factor. There may be one, or multiple, such event nodes. The event node is added to the first layer of nodes because the event, like faults, can also lead to a non-zero change to the mean value of a residual. For example, an operating condition can introduce a model bias that causes a residual to have a non-zero mean, as discussed above. The event node has connections to the second layer, the residuals, based on which residuals would be affected by the event. The conditional probability of a residual on the event can be computed based on the variance of the residual mean value (e.g., calculated based on historical measurements captured when the event occurred or was present).

After the structure of the Bayesian network 500 is defined (i.e., the conditional probability for every node in the Bayesian network 500 is defined), existing Bayesian network methods can be used to compute the marginal probability and likelihood of each set of observations, and from these values, the posterior probability for each fault or each diagnosis can be calculated.

Continuing with the heat exchanger 300 example, in the example scenario above, the set of observations O=(1, 1, 1, 1, 0, 1, 1, 1). Using the probabilistic diagnosis framework and Bayesian network 500, the posterior probability for $F_3=1$ (i.e., the probability for the sensor $S_3$ to be faulty) is: $P(F_3=1|O=(1, 1, 1, 1, 0, 1, 1, 1)=0.986$. The posterior probability for the other single faults is negligible. Thus, using the probabilistic diagnosis framework, the fault diagnosis device 102 can identify $F_3$ as the most likely fault. The fault diagnosis device 102 can then report $F_3$ as the final diagnostic result.

In other examples, the probabilistic diagnosis framework may yield identical or similar probabilities for different fault diagnoses. In such cases, the fault diagnosis device 102 may report both equally-likely fault diagnoses as the final diagnostic result. Further, in the final diagnostic report that the fault diagnosis device 102 reports, the fault diagnosis device 102 may include a ranked ordering of the faults (or combinations of faults), from most likely to least likely. Similarly, the final diagnostic report may include the probabilities of each fault or combinations of faults.

In addition, at block 214, the fault diagnosis device 102 can combine different fault diagnosis frameworks. For example, the fault diagnosis device 102 may first apply the MBD and/or the FDI diagnosis frameworks to determine possible fault diagnoses. The fault diagnosis device 102 may then apply the probabilistic diagnosis framework to determine the probability of the possible fault diagnoses, and determine which of the possible fault diagnoses is the most likely.

Regardless of the diagnosis framework applied, the fault diagnosis device 102 can report (i.e., display, present, or transmit to another computing device for display or presentation) the final diagnostic result including any identified faults. Further, depending on the implementation, the fault diagnosis device 102 can report any quantities or expressions (e.g., the physics-based models, the residual expressions, the residuals (e.g., at any time step or at several time steps), and/or the identified faults (e.g., at any time step or at several time steps)). As an example, the fault diagnosis device 102 can generate an alert indicating the final diagnostic result (e.g., indicating any identified faults or probabilities of the faults). The fault diagnosis device 102 can display the alert on a display of the user interface 118, or can transmit the alert to a computing device of the thermal hydraulic system 140 (e.g., the operator workstation 150). The computing device of the thermal hydraulic system 140 can then emit a sound (e.g., an alarm) indicating the alert, display the alert, or otherwise present the alert to a user.

Further, as mentioned previously, the fault diagnosis device 102 and/or the computing device of the thermal hydraulic system 140 can generate a remedial action to address the diagnosed faults, and transmit a control instruction to a controller (one of the controllers 148) of the thermal hydraulic system 140 to perform the remedial action.

Fault Diagnosis Framework for Multi-Component System

Figure 6:
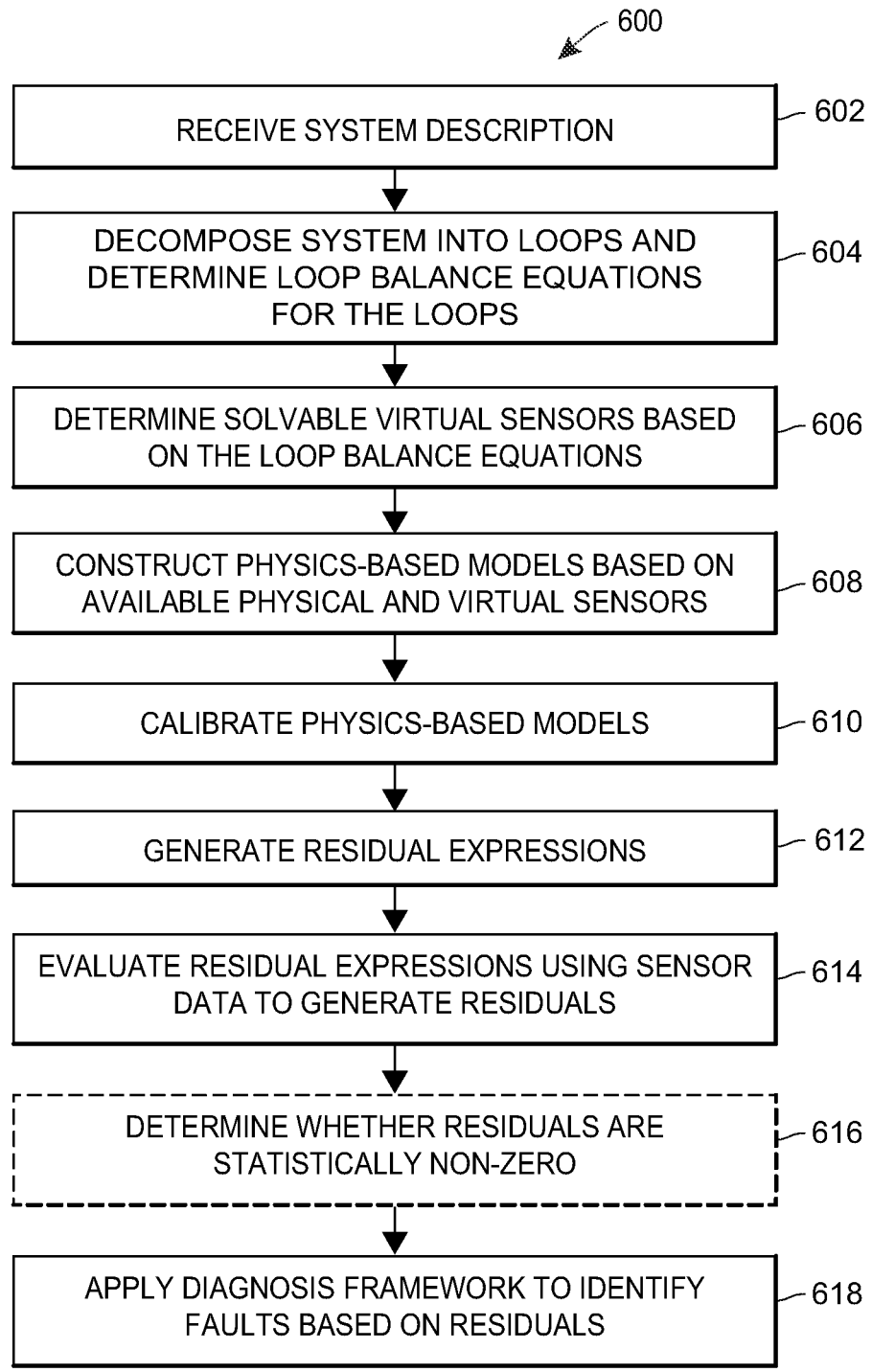
FIG. 6 is a flow diagram of an example method for diagnosing faults in a thermal hydraulic system.

FIG. 6 is a flow diagram of an example method 600 for diagnosing faults in the thermal hydraulic system 140. The method 600 shares many of the same steps as the method 200 for diagnosing faults associated with a single component (or sensors of the single component). Indeed, if all sensors to construct physics-based models of the components 144 of the thermal hydraulic system 140 are available, then the method 600 may be generally similar to the method 200. The systems-approach, however, will require constructing physics-based models and associated residual expressions for each component.

In practical applications, however, systems such as the thermal hydraulic system 140 may lack the sensors necessary to construct and calibrate individual physics-based models for each standalone component of the system. Accordingly, the systems-approach described below analyzes individual components using information obtained from other components and sensors in the thermal hydraulic system 140. In particular, this disclosure discusses two broad techniques, which can be combined, to address scenarios in which there are insufficient physical sensors to calibrate the physics-based models for the components 144: (1) construct a physics-based model for a combination of multiple components that can be calibrated by the available sensor set (i.e., construct an aggregated model that describes the operation of multiple components), and (2) computing the missing sensors utilizing other sensors from the system and relationships between the component and other components of the system (also referred to herein as a virtual sensor approach). The term "virtual sensor" is merely a convenient shorthand to refer to an expression for a variable that is not directly measured, but can be estimated using other sensors of the system.

Similar to the method 200, the method 600 is described below as performed by the fault diagnosis device 102. In particular, the fault diagnosis device 102 may implement the fault diagnosis module 108 in order to execute the method 600. However, depending on the implementation and/or scenario, individual steps of the method 600 may be performed by different computing devices and/or applications.

Initially, the fault diagnosis device 102 receives a system description of the thermal hydraulic system 140 (block 602). The system description indicates the components 144, the sensors 146, and interconnections of the thermal hydraulic system 140. The system description is generally similar to the description the fault diagnosis device 102 receives at block 202, except that the system description may be more complex and may include a large number of components, sensors, and interconnections. The system description also indicates the types and/or sub-types of the components 144. Depending on the implementation, the system description need not include geometric parameters of the components 144. The system description can be a schematic diagram, a P&ID, or a textual description of the thermal hydraulic system 140. For example, if the system description is a P&ID or other schematic diagram, the fault diagnosis device 102 can extract the types and locations of the components 144, sensors 146, and interconnections from the P&ID. The fault diagnosis device 102 can retrieve the system description from the systems diagrams database 122, for example.

The fault diagnosis device 102 then decomposes thermal hydraulic system 140 into loops based on the system description and determines loop balance equations for the loops (block 604). A loop is a continuous circuit for which physical conservation laws apply, such that loop balance equations can be written. In this context, a loop is generally a continuous circuit of mono-directional flow of a fluid between two ends of the thermal hydraulic system 140. A closed loop is a closed circuit of fluid flow in the thermal hydraulic system 140. However, the techniques of this disclosure can also be applied in other applications involving flows of other physical quantities rather than fluid. For example, in electrical components, charges flow in loops of an electric circuit. Conservation of current, conservation of charge, and conservation of energy apply to the circuit. These physical conservation laws allow for loop balance equations for both current and voltage to be written for the circuit.

In the current context, the fault diagnosis device 102 can construct loop balance equations involving the process variables of flow rate and enthalpy based on conservation of mass and conservation of energy. Assuming that there is no leakage and that heat loss in a pipe of the thermal hydraulic system 140 is negligible, loop balance equations can be constructed that describe the relationship between flow rate and enthalpy values (where enthalpy may be measured using temperature readings) at upstream locations, downstream locations, and flow branches.

Figure 7:
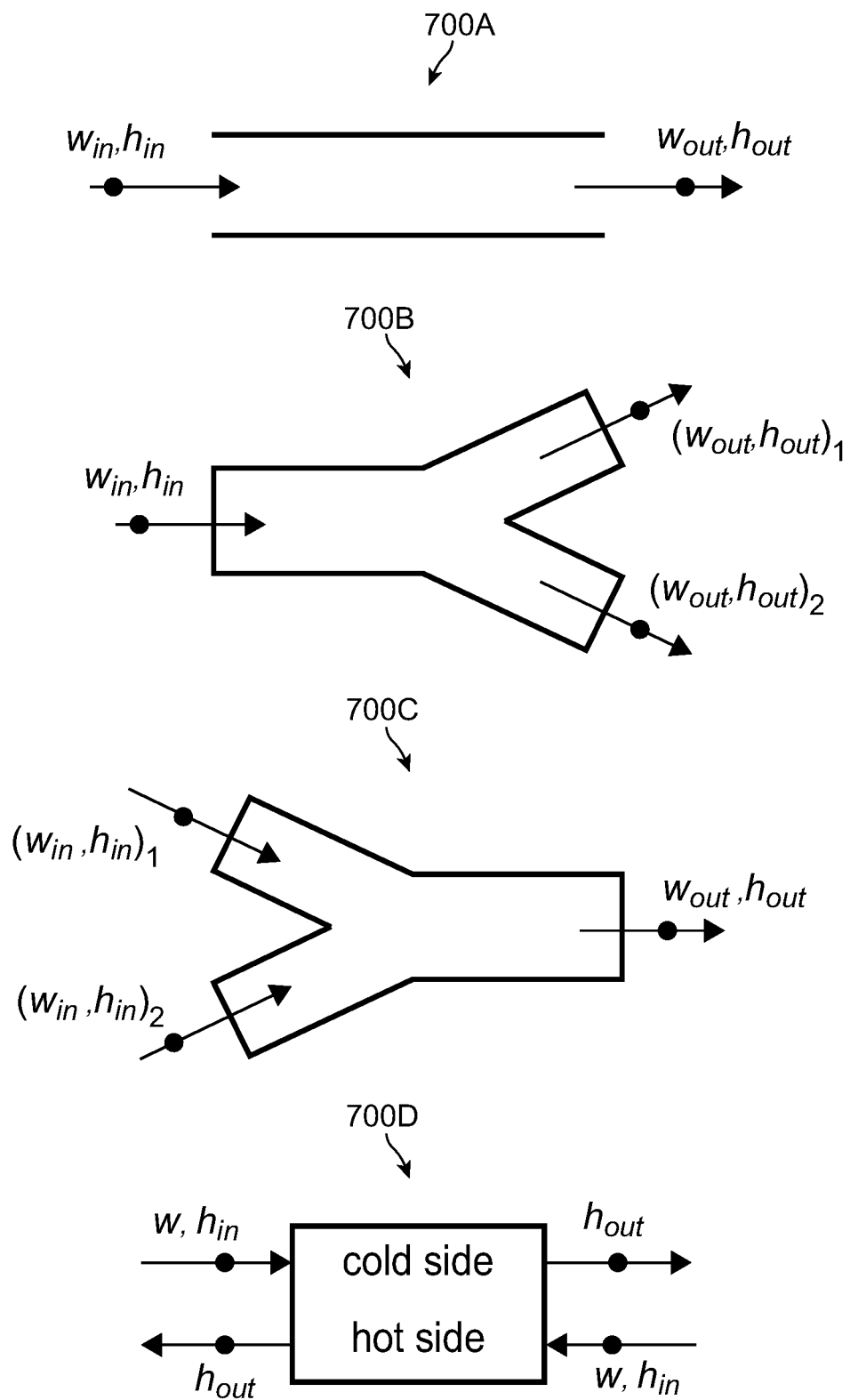
FIG. 7 illustrates example loops for which loop balance equations can be constructed.

Referring to FIG. 7, example loops for which the fault diagnosis device 102 can construct loop balance equations are illustrated. The arrows represent fluid flow, and the circles indicate locations at which indicated process variables (flow rate w and/or enthalpy h) can be measured. Depending on the system, there may or may not actually be one or more sensors at these locations to directly measure the indicated process variables. The example loops illustrated in FIG. 7 are simple examples meant to demonstrate the construction of loop balance equations. The loop balance equations discussed below can be generalized to more complex examples (e.g., a split in flow from one pipe to three).

For a loop 700A in which there is no flow splitting, the fault diagnosis device 102 can construct the following loop balance equations:

$$w_{in} = w_{out} \quad \text{(Equation 24)}$$

$$h_{in} = h_{out} \quad \text{(Equation 25)}$$

For a loop 700B in which the flow splits, the loop balance equations are:

$$w_{in} = (w_{out})_1 + (w_{out})_2 \quad \text{(Equation 26)}$$

$$h_{in} = (h_{out})_1 \quad \text{(Equation 27)}$$

$$h_{in} = (h_{out})_2 \quad \text{(Equation 28)}$$

For a loop 700C in which flows rejoin, the loop balance equations are:

$$w_{out} = (w_{in})_1 + (w_{in})_2 \quad \text{(Equation 29)}$$

$$w_{out} \cdot h_{out} = (w_{in} \cdot h_{in})_1 + (w_{in} \cdot h_{in})_2 \quad \text{(Equation 30)}$$

For a loop 700D including a heat exchanger with a cold side and a hot side, the loop balance equation is:

$$[(h_{out} - h_{in}) \cdot w]_{cold\ side} = [(h_{in} - h_{out}) \cdot w]_{hot\ side} \quad \text{(Equation 31)}$$

In accordance with these simple examples, the fault diagnosis device 102 generates loop balance equations for the thermal hydraulic system 140 based on the system description. By constructing and solving a system of loop balance equations, the fault diagnosis device 102 can estimate the value of a process variable (i.e., a flow rate w or an enthalpy h) for which there is no direct sensor measurement. The fault diagnosis device 102 can express the value of the missing sensor in terms of measurements of other sensors of the system. The fault diagnosis device 102 can label the output of such an expression as a "virtual sensor" to keep track of the estimated process variable value. Generally speaking, virtual sensors are constructed for enthalpy and flow rate but are not constructed for pressure because pressure loss along a flow may not be negligible.

The fault diagnosis device 102 determines the solvable virtual sensors based the loop balance equations (block 606). Depending on how many loop balance equations there are compared to the number of unknown process variables, only a certain number of virtual sensors may actually be solvable. The solvable virtual sensors are those which the fault diagnosis device 102 can utilize to construct the physics-based models for the components 144. The solvable virtual sensors for a particular component will depend on physical sensors of other components of the thermal hydraulic system 140.

The fault diagnosis device 102 identifies the components 144 of the thermal hydraulic system 144 and constructs physics-based models (e.g., physics-based models of the physics-based models 110) for the components 144 based on the available physical sensors and the available (i.e., solvable) virtual sensors (block 608). To determine which physics-based models can be constructed, the fault diagnosis device 102 can retrieve descriptions of physics-based models for generic component types from the model library 124. For each component of the components 144, the fault diagnosis device 102 constructs physics-based models for which there are sufficient physical and virtual sensors to calibrate the models. For example, for a particular component, the fault diagnosis device 102 can identify the type of component based on the system description, and retrieve, from the model library 124, a physics-based model from the model library 124 for that type of component and for which there are sufficient physical and virtual sensors to calibrate the physics-based model. For mass physics-based models, a set of flow rate sensors at each inlet and outlet location is required (see the description below Equation 4). For momentum physics-based models, sensors for inlet pressure, outlet pressure, and flow rate are required (see the description below Equation 5). For energy physics-based models, the required sensors varies by component. For the example heat exchanger 300, six sensors are required to measure flow rate, inlet temperature, and outlet temperature for both the cold and hot sides of the heat exchanger 300 (see the description below Equation 9).

If the required sensors (virtual and physical) are available, the fault diagnosis device 102 constructs physics-based models for each component of the components 144, similar to block 204 of the method 200. As mentioned previously, if the model library 124 includes a physics-based model for a component, then the fault diagnosis device 102 can retrieve the physics-based model from the model library 124 to construct the physics-based model.

In some implementations, even combining the solvable virtual sensors and available physical sensors, the fault diagnosis device 102 may be unable to construct a physics-based model for each component. In such implementations, the fault diagnosis device 102 can treat multiple components as a single, aggregate component and construct a physics-based model for the aggregate component (also referred to as an aggregate model) for which there are sufficient sensors for calibration. In the event that a standalone component does not have sufficient sensors for physics-based models for the individual component, the fault diagnosis device 102 can utilize aggregate models instead of, or in addition to, determining virtual sensors.

An example aggregate model is an aggregate model for a combined motor-pump system. If there are insufficient sensors (physical or virtual) for calibration of a standalone motor model and a standalone pump model, then an aggregate model can be constructed for the combined motor-pump system. In particular, the paragraphs below describe an aggregate model for the combined operation of an induction motor that drives a centrifugal pump.

For an example combined motor-pump system, available sensor readings may include: motor input power $P_m$, motor current I, shaft speed n, volumetric flow rate Q, pump suction pressure $P_{in}$, and pump discharge pressure $P_{out}$. Neither motor output power (i.e., torque $\tau_m$) nor pump input shaft power are measured. As a result, standalone physics-based models based on conservation of energy cannot be calibrated for the pump or the motor. Accordingly, the fault diagnosis device 102 constructs a physics-based model based on conservation of energy that describes operation of the combined pump-motor system.

Due to conservation of energy, for the combined pump-motor system:

$$W_{motor,out} = W_{pump,in} + W_{shaft\ losses} \qquad \text{(Equation 32)}$$

$$W_{pump,in} = W_{pump,out} + W_{pump\ losses} \qquad \text{(Equation 33)}$$

where $W_{motor,out}$ is the output shaft power of the motor, $W_{pump,in}$ is the input shaft power to the pump, $W_{shaft\ losses}$ represents losses due to motor bearings and other friction losses, $W_{pump,out}$ is the output pumping power, and $W_{pump\ losses}$ represents losses that may depend on speed and flow rate. Further, electrical input power $P_m$ is converted into mechanical output shaft power $W_{motor,out}$ with an efficiency $\eta(n)$ such that:

$$W_{motor,out} = \eta(n) P_m = \tau_m \times n \qquad \text{(Equation 34)}$$

Further, $W_{pump,out}$ can be computed from the pressure head $\Delta P_p$, where $\Delta P_p = P_{out} - P_{in}$, and the volumetric flow rate Q:

$$W_{pump,out} = \Delta P_p \times Q \cong \theta_{po,1} n^2 Q + \theta_{po,2} n Q^2 + \theta_{po,3} Q^3 \qquad \text{(Equation 35)}$$

where the expression for $\Delta P_p$ can be determined based on homologous characteristic curves for a centrifugal pump and $\theta_{po,1}$, $\theta_{po,2}$, and $\theta_{po,3}$ are unknown parameters.

Similarly, $$W_{pump,in} = \tau_p \times n \cong \theta_{pi,0} n^3 + \theta_{pi,1} n^2 Q + \theta_{pi,2} n Q^2 + \theta_{pi,3} Q^3 \qquad \text{(Equation 36)}$$

where the expression for the torque $\tau_p$ can be determined based on homologous characteristic curves for a centrifugal pump and $\theta_{pi,1}$, $\theta_{pi,2}$, and $\theta_{pi,3}$ are unknown parameters.

Combining Equations 32-36, neglecting third order terms in speed n, assuming that loss terms are first order in speed n, and assuming that efficiency $\eta(n)$ only weakly depends on speed n, a parametric model for input motor power can be constructed that depends on pump volumetric flow rate Q and motor shaft speed n:

$$P_m(Q,n) = \theta_1 n^2 Q + \theta_2 n Q^2 + \theta_3 Q^3 + \theta_4 n^2 + \theta_5 n \qquad \text{(Equation 37)}$$

This parametric model serves as a physics-based model, constructed using conservation of energy, for the combined pump-motor system. This physics-based model may be stored, for example, in the model library 124.

Turning back to the method 600, it should be understood that because the method 600 is an example method flow, blocks 604-608 may be performed in a different order in other example methods. For example, in some implementations, the fault diagnosis device 102 may identify the components 144 of the thermal hydraulic system 140 using the system description before decomposing the system into loops and determining the loop balance equations. The fault diagnosis device 102 can compare the physical sensors available for each component of the components 144 to the sensors needed to calibrate physics-based models for the component, where the required sensors for the physics-based models of each component type can be retrieved from the model library 124. If the thermal hydraulics system 140 includes all of the required sensors, the fault diagnosis device 102 can construct and calibrate the physics-based models for each component and proceed with the method 600 from the block 612. Otherwise, the fault diagnosis device 102 can determine which physical sensors are missing, and then proceed with blocks 604-606 to determine if virtual sensors can be constructed that replace the missing physical sensors. Alternatively or in addition, the fault diagnosis device 102 can determine if any aggregate models, which may or may not include virtual sensors, can be constructed.

Figure 8A:
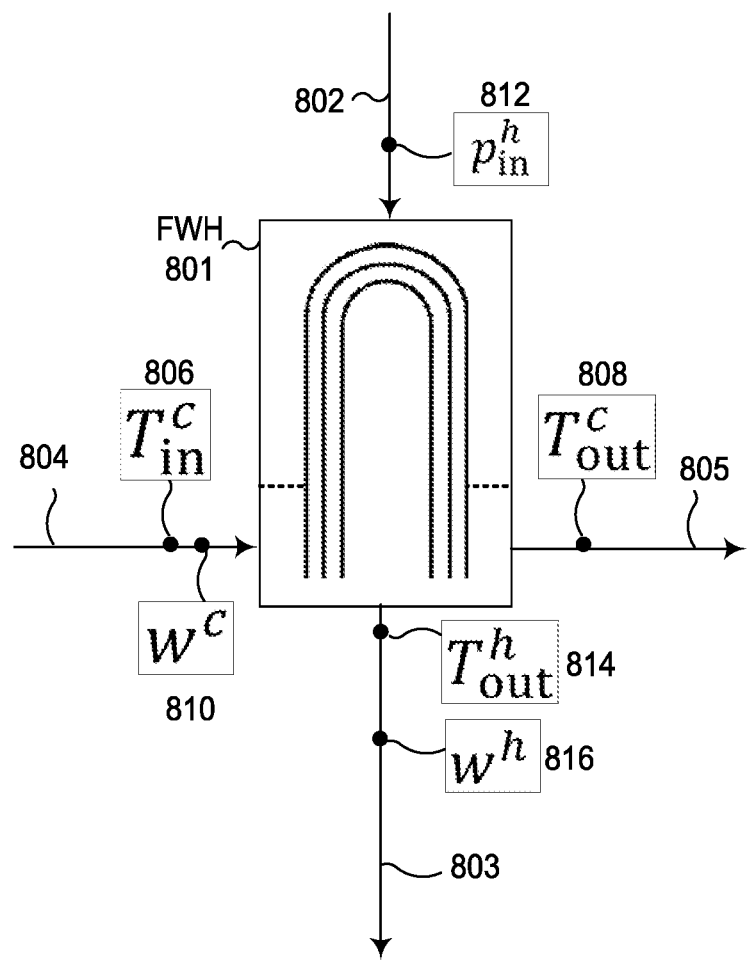
FIG. 8A is a schematic diagram illustrating an example vertical feedwater heater and theoretical sensor locations.
Figure 8B:
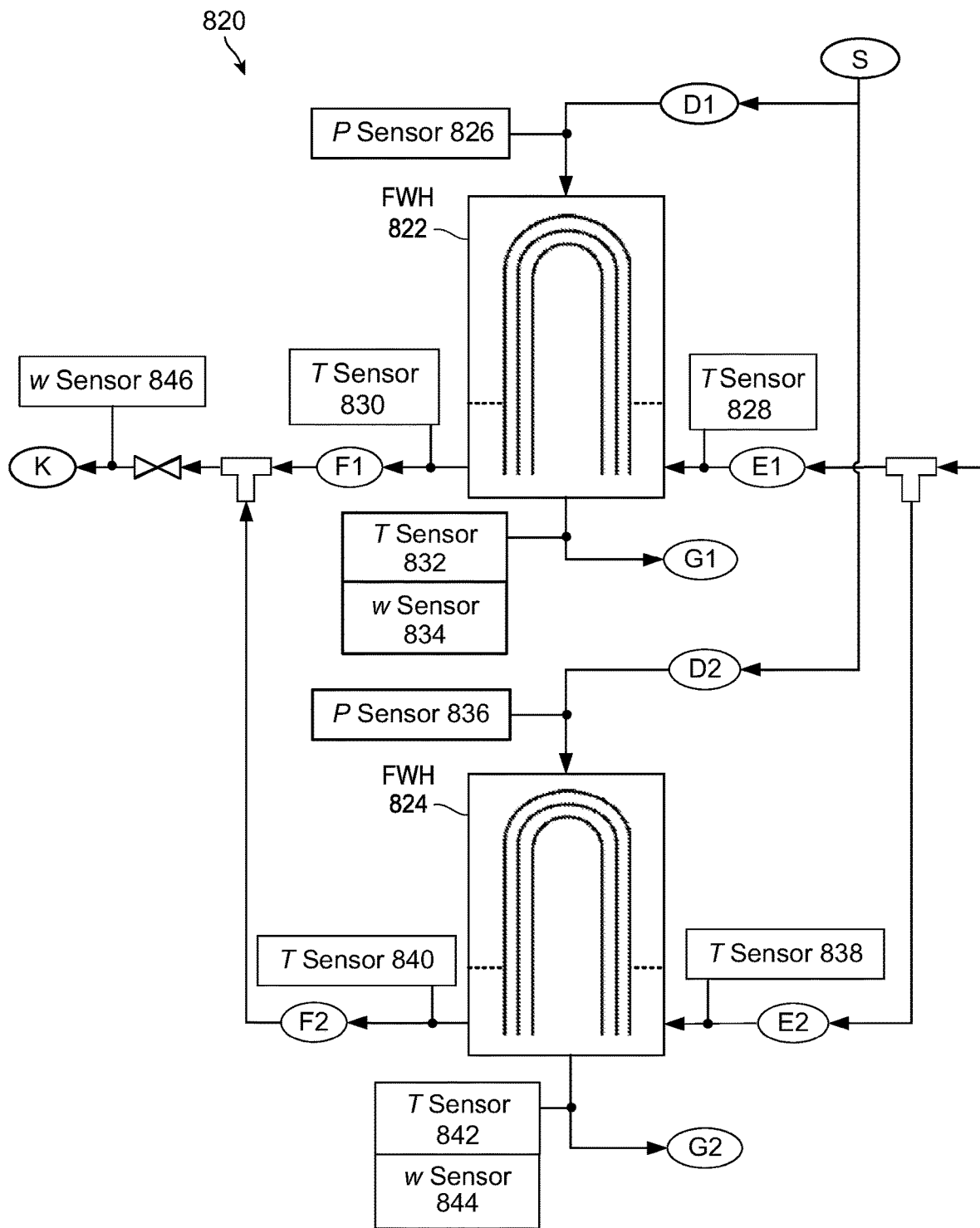
FIG. 8B is a schematic diagram illustrating an example thermal hydraulic system including two vertical feedwater heaters and physical sensor locations.
Figure 8C:
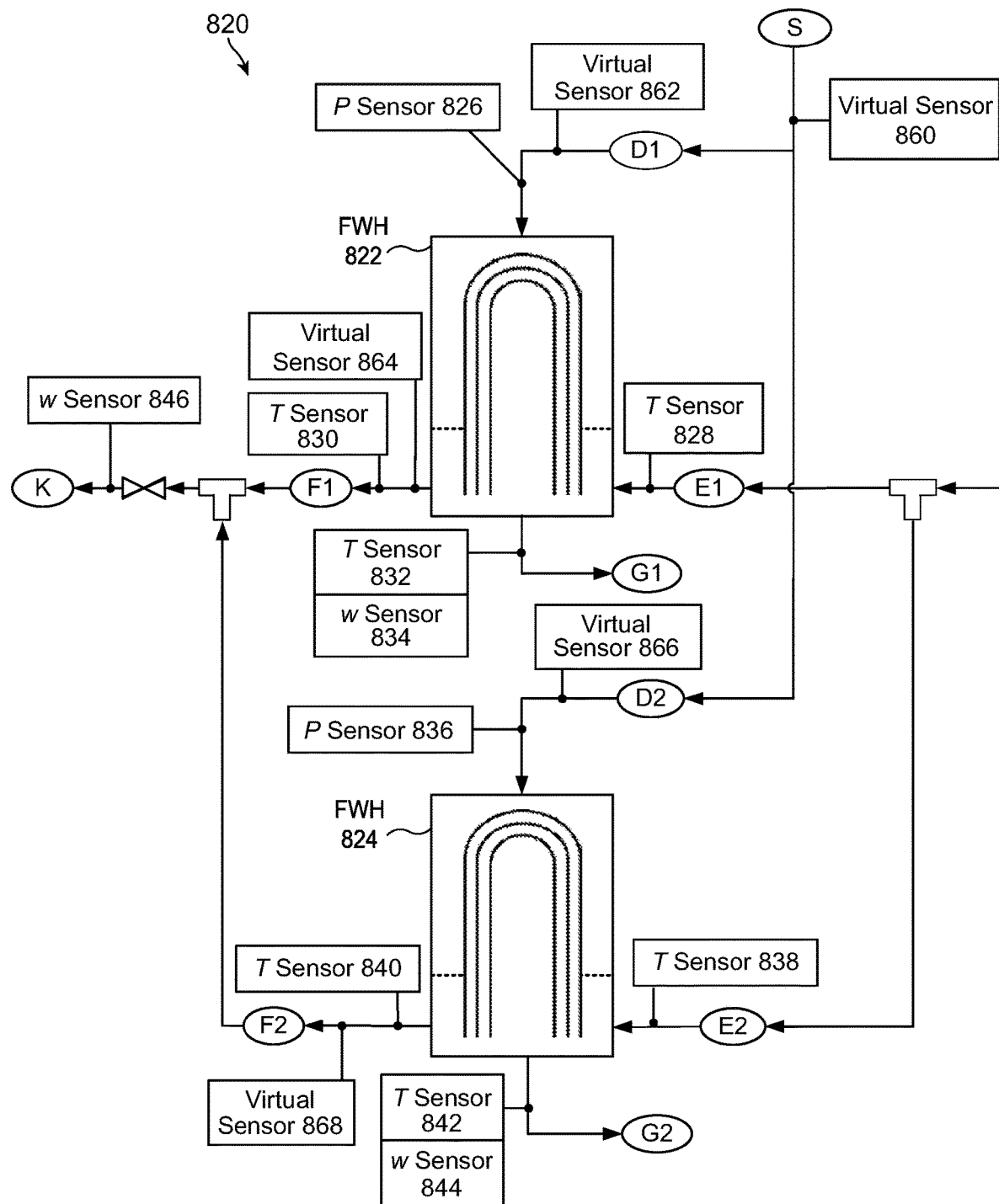
FIG. 8C is a schematic diagram illustrating the example thermal hydraulic system of FIG. 8B including virtual sensors generated using the techniques of this disclosure.

Referring briefly to FIGS. 8A-8C, these figures illustrate how virtual sensors can be constructed for an example system involving two vertical feedwater heaters. FIG. 8A is a schematic diagram of an example vertical feedwater heater (FWH) 801. In the example FWH 801, steam flows into the shell of the FWH 801 at location 802, condenses, and leaves the FWH 801 at a drain at location 803. Feedwater enters the FWH 801 at location 804, flows through a tube in the FWH 801, and leaves the FWH 801 at location 805. The steam condenses because the steam exchanges heat with the feedwater flowing through the FWH 801. Similar to the energy physics-based model for the heat exchanger 300, energy physics-based models can also be constructed for the FHW 801. Example physics-based models may require six sensors: a sensor 806 to measure $T_{in}^c$, a sensor 808 to measure $T_{out}^c$, a sensor 810 to measure $w^c$, a sensor 812 to measure $p_{in}^h$, a sensor 814 to measure $T_{out}^h$, and a sensor 816 to measure $w^h$. The temperatures $T_{in}^c$ and $T_{out}^c$ are the inlet and outlet temperatures of the feedwater entering and leaving the FHW 801. The flow rate $w^c$ is the flow rate of the feedwater, and the flow rate $w^h$ is the flow rate of the condensate at the drain of the FWH 801. The term $p_{in}^h$ is the pressure at the steam inlet of the FHW 801. The temperature $T_{out}^h$ is the temperature of the condensate at the drain. An example energy physics-based model for a FWH requires these six sensors: feedwater flow rate, feedwater inlet temperature, feedwater outlet temperature, steam inlet pressure, drain flow rate, and drain temperature. While not shown in FIG. 8A, in some implementations, the FWH 801 also includes a steam inlet quality sensor at the location 802. Energy physics-based models can also be constructed that utilize such a sensor in addition to the other six sensors described above.

However, in practice, FWHs may not have all six of these sensors. FIG. 8B is a schematic diagram of an example thermal hydraulic system 820. This thermal hydraulic system 820 may correspond to the thermal hydraulic system 140, or to a portion of the thermal hydraulic system 140. The schematic diagram is an example P&ID, which may correspond to a system description that the fault diagnosis device 102 can receive at block 602.

The thermal hydraulic system 820 includes a first FWH 822 and a second FWH 824. The labels S, D1, D2, E1, E2, F1, F2, G1, G2, and K are labels corresponding to locations of the thermal hydraulic system 820. The labels D1, E1, F1, and G1 correspond to the steam inlet, feedwater inlet, feedwater outlet, and drain of the first FWH 822, respectively. The labels D2, E2, F2, and G2 correspond to the steam inlet, feedwater inlet, feedwater outlet, and drain of the second FWH 824, respectively. The label S corresponds to a starting location of steam in the thermal hydraulic system 820, and the label K corresponds to an ending location of feedwater in the thermal hydraulic system 820.

Five sensors are associated with the FWH 822: steam inlet pressure sensor 826, feedwater inlet temperature sensor 828, feedwater outlet temperature sensor 830, drain temperature sensor 832, and drain flow rate sensor 834. Similarly, five sensors are associated with the FWH 824: steam inlet pressure sensor 836. feedwater inlet temperature sensor 838, feedwater outlet temperature sensor 840, drain temperature sensor 842, and drain flow rate sensor 844. Thus, the thermal hydraulic system 820 is missing at least one sensor to construct physics-based models for each of the FWHs 822 and 824. In particular, each of the FWHs 822 and 824 is missing a feedwater flow rate sensor. Further, the FWHs 822 and 824 are also missing steam inlet quality sensors, which some physics-based models rely upon.

Accordingly, the fault diagnosis device 102 can construct the following loop balance equations for the thermal hydraulic system 820 based on the schematic diagram, where the subscripts indicate the location of the measurement:

$$w_{F1}+w_{F2}=w_K \quad \text{(Equation 38)}$$

$$h_{D1}=h_S \quad \text{(Equation 39)}$$

$$h_{D2}=h_S \quad \text{(Equation 40)}$$

$$w_{F1}(h_{F1}-h_{E1})=w_{G1}(h_{D1}-h_{G1}) \quad \text{(Equation 41)}$$

$$w_{F2}(h_{F2}-h_{E2})=w_{G2}(h_{D2}-h_{G2}) \quad \text{(Equation 42)}$$

The variables $w_{F1}$, $w_{F2}$, $h_{D1}$, $h_{D2}$, and $h_S$ can be considered unknown variables because there are not sensors to directly measure these variables. The fault diagnosis device 102 can solve the system of equations provided by Equations 38-42 in order to solve for these unknown variables in terms of measurable variables. Thus, there are five virtual sensors corresponding to the expressions for these five unknown variables.

It should be noted that Equations 35-39 are a subset of the loop balance equations that can be determined for the thermal hydraulic system 820. Other loop balance equations can be written and other virtual sensors may be solved for. This disclosure discusses Equations 38-42 because these equations can be used to solve for the virtual sensors required for the example energy physics-based models for the FWHs 822 and 824.

FIG. 8C illustrates a schematic diagram of the thermal hydraulic system 820. FIG. 8C is generally similar to the FIG. 8B. However, the locations of solvable virtual sensors are shown. In particular, the unknown variables $w_{F1}$, $w_{F2}$, $h_{D1}$, $h_{D2}$, and $h_S$ correspond to virtual sensors 864, 868, 862, 866, and 860, respectively. Accordingly, the fault diagnosis device 102 can now construct physics-based models for the FWHs 822 and 824 using the physical and virtual sensors.

Referring back to FIG. 6, after constructing the physics-based models (block 608), the fault diagnosis device 102 calibrates the physics-based models for the components 144 using historical measurements (block 610). The fault diagnosis device 102 can calibrate the physics-based models using a manner similar to the block 206, described above. If virtual sensors are utilized for a component, the fault diagnosis device 102 can utilize historical sensor measurements to estimate historical values for the virtual sensors, and use these historical values to calibrate the physics-based models for the component. The historical values of a virtual sensor can be calculated using historical values of the physical sensors used to solve for the virtual sensor. Further, before calibrating the physics-based models, the fault diagnosis device 102 can apply the data processing steps discussed above with reference to block 206 to prepare the historical measurements for use.

In addition to the virtual sensors obtained from solving loop balance equations, unmeasured variables can also be computed from the predictions of the calibrated component models. This second type of virtual sensor is not needed for the model calibration process, but can be used by the fault diagnosis device 102 to generate additional residual expressions. Such second type virtual sensors are created for the purpose of maximizing the number of independent model residuals that can be generated, in order to improve the diagnostic resolution.

For an example of two second-type virtual sensors, consider the system shown in FIG. 8C. The two virtual sensors 864 and 868 were obtained by solving Equations 38-42. The fault diagnosis device 102 can use these two (first-type) virtual sensors, and the fact that the FWH 822 and the FWH 824 are connected in parallel, to construct a flow ratio model. The prediction of the calibrated flow ratio model can then be used to compute the two flow rates $w_{F1}$, $w_{F2}$ without relying on the two virtual sensors 864 and 868. As a result, there are two second-type virtual sensors for the flow rates at locations F1 and F2. These two second-type virtual sensors have different validity conditions compared to the virtual sensors 864 and 868 and can be used to generate additional residuals for the two FWHs 822 and 824.

The fault diagnosis device 102 generates residual expressions (e.g., residual expressions of the residual expressions 112) based on the physics-based models (block 612). The fault diagnosis device 102 can generate the residual expressions using a manner similar to the block 208, described above. Further, the fault diagnosis device 102 can automatically determine how many residual expressions can be constructed based on analytical redundancy relations of the physics-based models. Residual expressions can be defined using physical sensors and both types of virtual sensors. To generate residual expressions for a involving a virtual sensor, the fault diagnosis device 102 determines which components and physical sensors the virtual sensor depends on. A fault in a virtual sensor indicates a fault of one of the sensors or components involved in the virtual sensor expression.

The fault diagnosis device 102 evaluates the residual expressions using sensor data to generate residuals (block 614). The fault diagnosis device 102 generates the residuals in a manner similar to the block 210, described above. Before using the sensor data, the fault diagnosis device 102 can apply the data processing steps discussed above with reference to block 206 to prepare the sensor data for use.

Further, at block 616, the fault diagnosis device 102 can also determine whether residuals are statistically non-zero using methods described above with reference to block 212. The fault diagnosis device 102 can then apply a diagnosis framework (e.g., the MBD diagnosis framework, the FDI diagnosis framework, or the probabilistic diagnosis framework) (block 618). To apply the diagnosis framework, the fault diagnosis device 102 can use the methods described above with reference to block 214. As discussed with reference to the method 200, regardless of the diagnosis framework applied, the fault diagnosis device 102 can report (i.e., display, present, or transmit to another computing device for display or presentation) the final diagnostic result including any identified faults. More particularly, the fault diagnosis device 102 can generate an alert indicating the determined faults. Further, depending on the implementation, the fault diagnosis device 102 can report any quantities or expressions (e.g., the physics-based models, the residual expressions, the residuals (e.g., at any time step or at several time steps), and/or the identified faults (e.g., at any time step or at several time steps).

Sensor Assignment Optimization

FIG. 9 is a flow diagram of an example method 900 for optimizing a sensor set for a thermal hydraulic system (e.g., the thermal hydraulic system 140). The techniques described above (i.e., with reference to FIGS. 2-8C) can be used to diagnose faults in a thermal hydraulic system operating with a given physical sensor set. The method 900 can be used to address the inverse problem, i.e., to determine optimal locations and types of sensors to meet a given monitoring need. The fault diagnosis device 102 can thus generate a recommended sensor set for a new thermal hydraulic plant and/or recommendations for additional sensors and/or sensor locations that can increase the diagnostic capability of a sensor set of an existing thermal hydraulic system. A recommended sensor set determined using the method 900 can be installed in a thermal hydraulic system, and then used to monitor the thermal hydraulic system for faults in accordance with the other methods described with reference to FIGS. 2-8C.

The method 900 is described below as performed by the fault diagnosis device 102. In particular, the fault diagnosis device 102 may implement the sensor set optimization module 114 in order to execute the method 900. The sensor set optimization module 114 may call functions of the fault diagnosis module 108 in order to determine the diagnostic capability of a sensor set. Depending on the implementation and/or scenario, individual steps of the method 900 may be performed by different computing devices and/or applications.

Initially, the fault diagnosis device 102 receives a system description for a thermal hydraulic system (block 902). The system description can be a description of an existing thermal hydraulic system or of a theoretical thermal hydraulic system. Similar to the system description received at block 602, the system description indicates the components, the sensors, and the interconnections of the thermal hydraulic system. The system description also indicates the types and/or sub-types of the components. Depending on the implementation, the system description need not include geometric parameters of the component. The system description can be a schematic diagram, a P&ID, or a textual description of the thermal hydraulic system. For example, the system description can be a P&ID from which the fault diagnosis device 102 can extract the types and locations of the components and sensors, and the interconnections between the components. The system description may indicate (or the fault diagnosis device 102 may retrieve from the memory 106, access via the network 130, or receive via the user interface 118) available sensor locations where sensors theoretically could be placed. The fault diagnosis device 102 can retrieve the system description from the systems diagrams database 122, for example.

The fault diagnosis device 102 then determines a set of possible faults for the thermal hydraulic system and diagnostic objectives associated with the possible faults (block 904). The set of possible faults include sensor faults and faults that can occur in each component. To determine the set of possible faults, the fault diagnosis device 102 may access a list of components and the possible faults associated with each component. The fault diagnosis device 102 may store the list, access the list via the network 130, or receive the list as input from the user interface 118.

The fault diagnosis device 102 also determines the diagnostic objectives associated with the possible faults. The diagnostic objectives relate to the target monitoring capability of the optimal sensor set. A sensor set meets a diagnostic objective if the fault diagnosis device 102 is able to meet the diagnostic objective using data from the sensor set. For example, a single diagnostic objective may be to diagnose a particular fault of the possible faults. Multiple diagnostic objectives may be to diagnose each fault of the possible faults. As another example, a diagnostic objective may be to uniquely diagnose a particular fault of the set of possible faults. The set of diagnostic objectives may be to uniquely identify all possible faults of the set of possible faults. If the sensor set can "uniquely" diagnose a fault, the fault diagnosis device 102 can identify that the fault has occurred rather than other faults. Said another way, a "uniquely diagnosable" fault is one that the fault diagnosis device 102 can be distinguish from other faults as having occurred. To uniquely diagnose a fault, the fault diagnosis device 102 may identify a fault that has a higher posterior probability than other faults and/or that has a posterior probability above a threshold. As another example, a diagnostic objective may be to diagnose a fault within a threshold distance of an actual fault (i.e., to diagnose a fault of a component or sensor that is near the actual fault). Another example diagnostic objective may be to avoid incorrect diagnoses.

The number of diagnostic objectives may be less than the number of possible faults. For example, there may be a possible fault that is not key to the functioning of the thermal hydraulic system and is therefore not associated with a diagnostic objective. Some diagnostic objectives may be flagged as critical, such that any identified candidate optimal sensor set must meet the diagnostic objectives to be selected as the optimal sensor set.

The fault diagnosis device 102 may determine the diagnostic objectives by receiving the diagnostic objectives as input from the user interface 118 or via the network 130. The fault diagnosis device 102 may store a default set of diagnostic objectives to utilize if the fault diagnosis device 102 does not receive an the set of diagnostic objectives. For example, a default set of diagnostic objectives may be to uniquely diagnose each fault of the set of possible faults.

The fault diagnosis device 102 identifies an initial sensor set of the thermal hydraulic system and the diagnostic objectives met by the initial sensor set (block 906). The initial sensor set will serve as a first hypothesis or first approximation for the optimal sensor set. Thermal hydraulic systems may involve several components, interconnections, and available sensor locations. As a result of this system complexity, computation time increases exponentially as the size of the thermal hydraulic system grows (also referred to as the "curse of dimensionality" problem). By starting from a first approximation, the sensor set optimization module 114 can converge on the optimal sensor set with fewer iterations compared to starting with no approximation.

As one example, the initial sensor set may be the default sensor set indicated by the system description. For example, the fault diagnosis device 102 may receive a system description (such as a P&ID of a thermal hydraulic system) and extract the initial sensor set from the system description. Thus, the first approximation for the optimal sensor set corresponds to either actual, physical sensor locations (if the thermal hydraulic system is an existing system) or to planned physical sensor locations (if the thermal hydraulic system is a a system that is still in development). This first approximation allows the sensor set optimization module 114 to converge on the optimal sensor set with fewer iterations compared to starting with no approximation or starting with a randomly-selected approximation. As another example, the fault diagnosis device 102 may receive the initial sensor set via the user interface 118.

The fault diagnosis device 102 then determines which diagnostic objectives of the diagnostic objectives determined at block 904 the initial sensor set meets. The diagnostic objectives that the initial sensor set meets can be referred to as the diagnostic capability of the initial sensor set. For each diagnostic objective, the fault diagnosis device 102 determines whether the initial sensor set meets the diagnostic objective. For example, if the set of diagnostic objectives includes diagnosing each fault of the possible faults, then for each fault of the possible faults, the fault diagnosis device 102 determines whether the initial sensor set can be used to diagnose the fault. if the set of diagnostic objectives includes uniquely diagnosing each fault of the possible faults, then for each fault of the possible faults, the fault diagnosis device 102 determines whether the initial sensor set can be used to uniquely diagnose the fault. The fault diagnosis device 102 does not need to receive actual sensor data from the initial sensor set. Rather, the fault diagnosis device 102 can determine, if the fault diagnosis device 102 were to receive sensor data from the initial sensor set, which faults would be diagnosable.

To determine the capability of the initial sensor set to diagnose a particular fault, the fault diagnosis device 102 can utilize the techniques discussed above with reference to FIG. 2 and FIG. 6. More particularly, the fault diagnosis device 102 can construct physics-based models for the components of the thermal hydraulic system based on the physical sensors in the initial sensor set and any virtual sensors that can be constructed for the thermal hydraulic system (e.g., blocks 604, 606, and 608). Based on the physics-based models, the fault diagnosis device can generate residual expressions and identify which sensors and components are involved in the residual expressions (e.g., block 612). The fault diagnosis device 102 can then identify which residuals would be zero or non-zero for each fault of the set of possible faults (e.g., the information summarized in Table 2).

Each fault (or combination of faults) is therefore associated with a combination of zero and non-zero residuals. In the scenario involving Table 2, for example, $F_3$ is associated with residuals $(r_{UA}, r_0, r_1, r_2, r_3, r_4, r_5, r_6) = (1, 1, 1, 1, 0, 1, 1, 1, 1)$, and multiple faults would cause all eight residuals to be non-zero. Given a set of residuals, the fault diagnosis device 102 can use a fault diagnosis framework to diagnose the associated faults (e.g., block 614). For example, the fault diagnosis device 102 can use the FDI diagnosis framework described above to determine, given a set of residuals, all valid diagnoses.

The fault diagnosis device 102 can determine, using different combinations of residuals, whether each fault of the set of possible faults can be diagnosed, uniquely diagnosed, diagnosed within a threshold distance, etc. Thus, the fault diagnosis device 102 can determine which of the diagnostic objectives the initial sensor set meets.

Next, the fault diagnosis device 102 calculates the overall cost (also referred to herein as a "score") of the initial sensor set using a cost function (block 908). Generally speaking, the cost function represents the "cost" of satisfying the diagnostic objectives using a given set of sensors, considering both monetary cost of the sensors and how well the sensor set performs with respect to diagnostic objectives. Thus, the output of the cost function, the score of a sensor set, represents a measure of the diagnostic capability of a sensor set taking into account how expensive the sensor set would be to install and operate, with a low score corresponding to a preferred sensor set. A score of a given sensor set is increased by a monetary cost of installing, procuring, and/or maintaining the sensor set, and is decreased by the sensor set meeting each diagnostic goal. For example, the score of a sensor set may be decreased for each fault of a set of possible faults that the sensor set can uniquely diagnose. The optimal sensor set of a thermal hydraulic system is the sensor that minimizes this cost function, i.e., the sensor set with the minimum score or overall cost.

An example cost function is:

$$\text{Score} = \Sigma_i \Sigma_j (C_{I_j} + C_{S_j}) k_{ij} - \Sigma_m \Sigma_l \alpha D_{l(m)} \qquad \text{(Equation 43)}$$

where:
i=sensor location (e.g., of the available sensor locations),
j=sensor type (e.g., pressure, temperature, flow rate, etc.),
$k_{ij}$=1 for new sensor of type j at location i; $k_{ij}$=0 otherwise,
l=fault type (e.g., leakage, fouling, sensor, etc.),
m=component index
$C_{I_j}$=cost of installing sensor of type j,
$C_{S_j}$=cost of procuring sensor of type j,
$D_{l(m)}$=diagnosis made for fault of type l in component m, and
$\alpha$=a scaling factor.

Values such as the cost of installing and procuring sensors may be stored at the fault diagnosis device 102 or otherwise received at the fault diagnosis device 102 (e.g., via the network 130 or via the user interface 118). In the example cost function of Equation 43, the score is increased by the monetary cost of installing or procuring each sensor, and decreased if a diagnostic objective (i.e., diagnosing a fault) is met.

The fault diagnosis device 102 uses a cost function, such as the Equation 43, to calculate a score of the initial sensor set. This score will serve as a baseline score, to which the scores of other sensor sets will be compared.

The fault diagnosis device 102 iteratively generates possible sensor sets based on the available sensor locations and starting from the initial sensor set (block 910). The fault diagnosis device 102 calculates the score of each possible sensor set to determine the sensor set that minimizes the cost function, i.e., the optimal sensor set. In some implementations, the optimal sensor set must at least satisfy critical diagnostic objectives in order to be selected.

The algorithm that the fault diagnosis device 102 uses to iteratively spawn possible sensor sets to converge at a minimum score can vary with implementation and with the form of the cost function. For example, for a cost function like Equation 43, the optimization problem is formulated as a mixed-integer problem because at least one of the variables, $k_{ij}$, can take only integer values. One method of solving such a mixed-integer problem is to utilize a genetic algorithm. Genetic algorithms are general-purpose optimization techniques based on principles of biological evolution (i.e., survival of the fittest). The genetic algorithm may start with the initial sensor set and randomly "mutate" this initial sensor set (e.g., by changing the location of a sensor, or adding a sensor) to generate a new candidate sensor set. The score of this new candidate (i.e., the "fitness" of the candidate) can be calculated and compared to the score of the initial sensor set. New candidate sensor sets can iteratively be generated based on the previous candidate sensor set, until an optimal sensor set that provides the minimum score is determined.

The fault diagnosis device 102 can report (i.e., display, present, or transmit to another computing device for display or presentation) the optimal sensor set, the diagnostic capability of the optimal sensor set, the overall cost of the optimal sensor set, and/or any of the intermediate quantities that the fault diagnosis device 102 calculates while determining the optimal sensor set.

Further, as mentioned above, different computing devices may implement the steps of the method 900. For example, a first computing device may be configured to determine diagnostic objectives that are met by a given sensor set (e.g., by determining the physics-based models and residual expressions for a system with the given sensor set). A second computing device may perform blocks 902-904 and 908-910. At block 906, the second computing device can request the diagnostic objectives met by the initial sensor set from the first computing device. Similarly, at block 910, the second computing device can request the diagnostic objectives met by each iteratively-generated sensor set from the first computing device.

Example Methods

FIGS. 10-12 illustrate example methods of this disclosure. It should be understood that the example methods illustrated by FIGS. 10-12, and the techniques discussed above with reference to FIG. 2 and FIG. 6, can be performed automatically by computing devices of the system 100 without manual intervention by a human.

FIG. 10 is a flow diagram of an example method 1000 for diagnosing faults associated with a component (e.g., a component of the components 144) of a thermal hydraulic system (e.g., the thermal hydraulic system 140), which can be implemented by one or more processors of a computing system (e.g., the processor(s) 104 of the fault diagnosis device 102). For example, the method 1000 may be implemented as a set of instructions stored on a computer-readable medium and executable by the one or more processors.

To begin, the computing system receives a description of a component of a thermal hydraulic system (block 1002). The description indicates: (i) a type of the component (e.g., heat exchanger, pump, condenser, valve, etc.); (ii) connections between the component and other components of the thermal hydraulic system, and (iii) sensor information including, for each sensor of one or more sensors of the component, a type of the sensor (e.g., flow rate, temperature, pressure, etc.), and a location of the sensor (e.g., outlet, inlet, cold-side, hot-side, etc.). To receive the description of the component, the computing system may receive a P&ID of the thermal hydraulic system, and extract the description of the component from the P&ID. Alternatively or in addition, the computing system may receive user input indicating the description (e.g., via the user interface 118).

Next, the computing system constructs, based on a physical conservation law and using the description, a physics-based model (e.g., one of the physics-based models 110) describing operation of the component (block 1004). The physics-based model may include one or more unknown parameters (e.g., the unknown parameters $\theta$ described above). The physical conservation law may be, for example, conservation of energy, conservation of momentum, conservation of mass, conservation of charge, or conservation of current. To construct the physics-based model, the computing system may retrieve the physics-based model from a database including a plurality of physics-based models (e.g., the model library 124). To determine which physics-based model to retrieve, the computing system can use the type of the component and the sensor information indicating the physical sensors that are available. The computing system can retrieve a physics-based model for the type of the component and for which there are sufficient physical sensors for calibration. Further, the computing system may modify the physics-based model after retrieving the physics-based model from the database (e.g., to conform to the connections of the particular component based on the description).

The computing system receives historical measurements captured by the one or more sensors (block 1006), and uses these historical measurements to calibrate the physics-based model (block 1008). The historical measurements may be captured during fault-free operation of the thermal hydraulic system, or during any other reference period to which real-time sensor data is to be compared. The computing system calibrates the physics-based model by calculating the one or more unknown parameters using the historical measurements to produce a calibrated model. To calculate the unknown parameters, the computing system can fit the physics-based model to the historical measurements (e.g., using a regression technique).

After producing the calibrated model, the computing system receives sensor measurements captured by the one or more sensors at a time instance (block 1010). More particularly, the computing system can receive sensor measurements captured at multiple time instances over a period of time. The computing system can receive the sensor measurements in real-time from the thermal hydraulic system as the thermal hydraulic system operates. Depending on the implementation, the computing system can receive sensor measurements in one or more batches, from the thermal hydraulic system or from another computing device that stores sensor data of the thermal hydraulic system.

The computing system can then calculate residuals corresponding to differences between measurements predicted by the physics-based model and the sensor measurements (block 1012). The computing system can generate residual expressions based on the calibrated model. For example, the computing system can generate the residual expressions based on analytical redundancy relations of the calibrated model. The computing system can then evaluate the residual expressions using the sensor measurements to calculate the residuals. Non-zero residuals indicate faults present in a sensor or the component. Calculating the residuals may also include determining whether evaluated residuals are statistically zero or non-zero. For example, the computing system may estimate a standard deviation and a mean of a residual using historical measurements, and determine that the residual is statistically non-zero if, for the residual at the time instance, a decision function of a statistical change algorithm exceeds a threshold.

The computing system can determine, based on the calculated residuals, a fault, of the component or of a sensor, that is present at the time instance (block 1014). The computing system can determine the fault by applying a fault diagnosis framework to the residuals, such as an MBD framework, an FDI framework, or a probabilistic diagnosis framework. In some implementations, determining the fault may include determining a set of the residuals that are non-zero, determining, for each non-zero residual, a set of possible faults associated with the non-zero residual, and determining the fault by identifying the fault that is consistent with the sets of possible faults. Additionally, the computing system may determine a set of the residuals that are zero, and eliminate at least one fault as the fault based on the set of zero residuals (e.g., the exoneration process discussed above with respect to the FDI framework). Additionally or alternatively, the computing system may determine a fault that is probabilistically the most likely fault given the possible faults. The computing system can determine a single fault, multiple faults, or combinations of faults, and can determine the probability of the fault(s) or fault combinations.

For example, to determine a fault using a probabilistic framework, the computing system can determine a set of the calculated residuals that are non-zero, and determine a set of possible faults capable of being present in the component and in the one or more sensors. The set of possible faults, for example, may be all possible faults of the component and the sensors. The computing system can then use a Bayesian network (e.g., the Bayesian network 500) to determine, for each particular fault of the set of possible faults, a probability of the particular fault given the set of non-zero residuals. The Bayesian network has at least three layers of nodes: (i) a first layer of nodes corresponding to the set of possible faults, (ii) a second layer of nodes corresponding to the residuals, and (iii) a third layer of nodes corresponding to the observations of the residuals. The observations correspond to whether the residuals are statistically zero or statistically non-zero (e.g., the output of a statistical change detection method). The fault of the set of possible faults having the highest probability can be identified as a fault that is present in the component or sensor.

The computing system can generate an alert indicating that the fault is present in the component or the sensor (block 1016). The alert can indicate the fault (e.g., the location and/or type of fault, such as whether the fault is a component fault or a sensor fault), and can also indicate the probability of the fault (if calculated at block 1014). Further, if the computing system identifies multiple faults, the alert can indicate the multiple faults. The computing system can display (e.g., via a display of the user interface 118) the alert, or transmit an indication of the alert over a communications network (e.g., the network 130), to a computing device, such as a computing device of the thermal hydraulic system (e.g., the operator workstation 150). Further, the computing system can also determine an action to address the fault (e.g., a remedial action such as shutting off the component or the sensor, or redirecting flow away from the component or sensor), and can transmit a control instruction to a controller of the thermal hydraulic system, which can perform the action. Alternatively or in addition, the computing system can transmit an indication of the action to the another computing device of the thermal hydraulic system (e.g., the operator workstation 150).

The computing system can calculate residuals, determine faults, and generate alerts for any time step for which the computing system receives sensor measurements.

FIG. 11 is a flow diagram of an example method 1100 for diagnosing faults in a thermal hydraulic system (e.g., the thermal hydraulic system 140), which can be implemented by one or more processors of a computing system (e.g., the processor(s) 104 of the fault diagnosis device 102). For example, the method 1100 may be implemented as a set of instructions stored on a computer-readable medium and executable by the one or more processors.

The computing system first receives a system description of a thermal hydraulic system (block 1102). The system description indicates: (i) for each component of a plurality of components of the thermal hydraulic system, a type of the component and a location of the component in the thermal hydraulic system, (ii) connections between the plurality of components, and (iii) sensor information, including, for each sensor of one or more sensors of the thermal hydraulic system, a type of the sensor and a location of the sensor in the thermal hydraulic system. To receive the system description, the computing system may receive a P&ID of the thermal hydraulic system. Alternatively or in addition, the computing system may receive user input indicating the system description (e.g., via the user interface 118).

Next, the computing system constructs, based on physical conservation laws and using the system description, a plurality of physics-based models corresponding to the plurality of components (block 1104). Each of the plurality of physics-based models may include one or more unknown parameters (e.g., the unknown parameters θ described above). The physical conservation laws may be, for example, conservation of energy, conservation of momentum, conservation of mass, conservation of charge, or conservation of current.

To construct the physics-based model, the computing system may retrieve, for each component, based on the type of the component, one or more generic physics-based models for the component from a database including a plurality of generic physics-based models (e.g., the model library 124). To determine which generic physics-based model to select for each component, the computing system can utilize the sensor information. More particularly, the computing system can generate, based on physical conservations laws and using the system description, a plurality of balance equations. Based on the plurality of balance equations, determine unmeasured variables that are capable of being expressed as functions of variables that are measurable by the one or more sensors of the thermal hydraulic system (i.e., virtual sensors). The computing system can then select the physics-based model from the one or more generic physics-based models based on the unmeasured variables and the variables. The selected physics-based model should be one that is (i) for the component, and (ii) for which there are sufficient sensors (either physical or virtual) for calibration. Further, one or more of the physics-based models may be aggregate models that describe the operation of multiple components (e.g., if there are insufficient physical or virtual sensors to calibrate a physics-based model for a standalone component).

To calibrate the plurality of physics-based models, the computing system receives historical measurements captured by the one or more sensors (block 1106). The historical measurements may be captured during fault-free operation of the thermal hydraulic system, or during any other reference period to which real-time sensor data is to be compared. The computing system calibrates the plurality of physics-based models by calculating the one or more unknown parameters of each of the plurality of physics-based models using the historical measurements to produce a plurality of calibrated models (block 1108). To calculate the unknown parameters, the computing system can fit the physics-based model to the historical measurements (e.g., using a regression technique). If a physics-based model relies upon unmeasured variables, then the computing system can generate historical values of the unmeasured variables using the historical measurements, and can calculate the one or more unknown parameters using both the historical values and the historical measurements.

After producing the calibrated models, the computing system receives sensor measurements captured by the one or more sensors at a time instance (block 1110). Block 1110 is generally similar to block 1010, except that the one or more sensors are associated with multiple components of the thermal hydraulic system. The computing system can then calculate residuals corresponding to differences between measurements predicted by the plurality of calibrated models and the sensor measurements (block 1112). Block 1112 is generally similar to block 1012, except that there are residuals associated multiple components rather than only one component. Based on the calculated residuals, the computing system determines a fault, of a particular component of the plurality of components or of a particular sensor of the one or more sensors, that is present at the time instance (block 1114). The computing system can apply the fault diagnosis frameworks discussed above with reference to block 1014. The computing system can then generate an alert indicating that the fault is present in the particular component or the particular sensor (block 1116). Block 1116 is generally similar to block 1016.

FIG. 12 is a flow diagram of an example method 1200 for determining an optimal sensor set of a thermal hydraulics system (e.g., the thermal hydraulic system 140), which can be implemented by one or more processors of a computing system (e.g., the processor(s) 104 of the fault diagnosis device 102). For example, the method 1200 may be implemented as a set of instructions stored on a computer-readable medium and executable by the one or more processors.

The computing system identifies a set of possible faults of the thermal hydraulic system and a set of diagnostic objectives associated with the set of possible faults (block 1202). For example, the computing system may receive the set of possible faults or the set of diagnostic objectives via a communications network (e.g., the network 130), or via a user interface (e.g., the user interface 118). Diagnostic objectives, for example, can include diagnosing a fault of the set of possible faults, uniquely diagnosing a fault of the set of possible faults, or diagnosing a fault of the set of possible faults within a threshold distance (e.g., determining that there is a fault within a localized region of the thermal hydraulic system). The thermal hydraulic system may be an existing thermal hydraulic system for which an optimal sensor set is sought, or may be a theoretical thermal hydraulic system that is being planned or designed.

Next, the computing system obtains a plurality of descriptions of a respective plurality of sensor sets (block 1204). The computing system can obtain a first description by receiving a first description of a first sensor set. Based on the first description, the computing system can generate a second description of a second sensor set. The computing system can then generate a third description based on the second description, and so on. Each description of the plurality of descriptions includes types of sensors of the respective sensor set of the plurality of sensor sets, and locations of the sensors of the respective sensor set.

Receiving the first description may include receiving a system description of the thermal hydraulic system, the system description indicating: for each component of a plurality of components of the thermal hydraulic system, a type of the component and the location of the component in the location of the component in the thermal hydraulic system, and the connections between the plurality of components. For example, receiving the system description may include receiving a P&ID of the thermal hydraulic system. The computing system can extract the first description from the system description. The first description corresponds to actual sensor locations (if the thermal hydraulic system is an existing system) or planned sensor locations (if the thermal hydraulic system is in a design stage). The computing system can also determine available sensor locations (e.g., by extracting available locations from the system description or P&ID), and use these available sensor locations to generate the second description. Further, the computing system can generate the second description using a genetic algorithm (discussed above with reference to block 910).

For each particular sensor set of the plurality of sensors sets, the computing system generates, based on the description of the particular sensor set, a diagnostic capability of the particular sensor set (block 1206). The diagnostic capability corresponds to a measure of how many diagnostic objectives of the set of diagnostic objectives are met by the particular sensor set. To determine the diagnostic capability of the particular sensor set, the computing system can utilize the techniques discussed with reference to FIGS. 10 and 11. The computing system can receive a system description. The computing system can then construct, based on physical conservation laws, the system description, and the description of the particular sensor set, a plurality of physics based models for the plurality of components of the thermal hydraulic system. Based on the physics-based models, the computing system can generate residual expressions using analytical redundancy relations of the plurality of physics-based models, and determine the diagnostic capability of the particular sensor set based on the residual expressions. More particularly, the computing system can determine, for possible combinations of zero residuals and non-zero residuals (the possible outputs of the residual expressions), whether a corresponding fault of the set of possible faults can be diagnosed. For example, the computing system may utilize the probabilistic diagnostic framework described above to determine whether a given combination of zero and non-zero residuals would identify a fault to within a predetermined probability threshold.

For each particular sensor set of the plurality of sensor sets, the computing system calculates a score of the particular sensor set based on the description of the particular sensor set and the diagnostic capability of the particular sensor set (block 1208). The score of the sensor set can be calculated using a cost function. A monetary cost of the sensor set (e.g., an installation cost and/or a maintenance cost of the sensor set) increases the score and the sensor set meeting a diagnostic objective of the set of diagnostic objectives decreases the score. The computing system can identify the optimal sensor set as the sensor set of the plurality of sensor sets that has the lowest score (block 1210). Generally speaking, the computing system iteratively generates and evaluates the scores of possible sensor sets in order to determine an optimal sensor set that minimizes the cost function.

The computing system can then display an indication of the optimal sensor set (block 1212). For example, the computing system can display a description of the optimal sensor set (e.g., the locations and types of sensors of the optimal sensor set) and/or a score of the optimal sensor set. The computing system can also transmit an indication of the optimal sensor set to another computing device for display or presentation.

Aspects

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A method for determining an optimal sensor set, the method comprising: identifying, by one or more processors, a set of possible faults of a thermal hydraulic system and a set of diagnostic objectives associated with the set of possible faults; obtaining, by the one or more processors, a plurality of descriptions of a respective plurality of sensor sets, wherein obtaining the plurality of descriptions includes: receiving a first description of a first sensor set of the plurality of sensor sets, and generating, based on the first description, a second description of a second sensor set of the plurality of sensor sets, wherein each description of the plurality of descriptions includes types of sensors of the respective sensor set of the plurality of sensor sets and locations of the sensors of the respective sensor set; for each particular sensor set of the plurality of sensor sets: determining, by the one or more processors, based on a particular description of the plurality of descriptions that corresponds to the particular sensor set, a diagnostic capability of the particular sensor set corresponding to diagnostic objectives of the set of diagnostic objectives that are met by the particular sensor set; and calculating, by the one or more processors, a score of the particular sensor set based on the particular description and the diagnostic capability, wherein a score of a sensor set is increased by a monetary cost of the sensor set and decreased by the sensor set meeting a diagnostic objective of the set of diagnostic objectives; identifying, by the one or more processors, the optimal sensor set that has a lowest score of the plurality of sensor sets; and displaying, by the one or more processors, an indication of the optimal sensor set.

2. The method of aspect 1, wherein at least one diagnostic objective of the set of diagnostic objectives includes diagnosing a fault of the set of possible faults.

3. The method of aspect 1 or 2, wherein at least one diagnostic objective of the set of diagnostic objectives includes uniquely diagnosing a fault of the set of possible faults.

4. The method of any one of aspects 1-3, wherein at least one diagnostic objective of the set of diagnostic objectives includes diagnosing a fault of the set of possible faults within a threshold distance.

5. The method of any one of aspects 1-4, wherein the monetary cost of the sensor set includes an installation cost of installing the sensor set.

6. The method of any one of aspects 1-5, wherein the monetary cost of the sensor set includes a maintenance cost of maintaining the sensor set.

7. The method of any one of aspects 1-6, further comprising: receiving, at the one or more processors, a system description of the thermal hydraulic system, the system description indicating: for each component of a plurality of components of the thermal hydraulic system, a type of the component and the location of the component in the thermal hydraulic system; and the connections between the plurality of components; wherein determining the diagnostic capability of the particular sensor set includes: constructing, based on physical conservation laws, the system description, and the particular description of the particular sensor set, a plurality of physics-based models corresponding to the plurality of components; generating residual expressions using analytical redundancy relations of the plurality of physics-based models; and determining the diagnostic capability of the particular sensor set based on the residual expressions.

8. The method of aspect 7, wherein constructing the physics-based models includes retrieving, based on the system description and the particular description of the particular sensor set, the physics-based models from a database including a plurality of generic-physics based models.

9. The method of aspect 7 or 8, wherein: each residual expression can evaluate to a zero residual or a non-zero residual; each fault of the set of possible faults corresponds to a combination of zero residuals and non-zero residuals; and determining the diagnostic capability of the particular sensor set based on the residual expressions includes: determining, for possible combinations of zero residuals of the residual expressions and non-zero residuals of the residual expressions, whether a corresponding fault of the set of possible faults can be diagnosed.

10. The method of aspect 9, wherein determining, for possible combination of zero residuals and non-zero residuals, whether the corresponding fault of the set of possible faults can be diagnosed includes determining whether a fault of the set of possible faults can be diagnosed within a predetermined probability threshold.

11. The method of any one of aspects 7-10, wherein receiving the system description includes receiving a piping and instrumentation diagram (P&ID) of the thermal hydraulic system.

12. The method of aspect 11, wherein receiving the first description includes: extracting, from the P&ID, the first description.

13. The method of any one of aspects 1-12, further comprising: determining, by the one or more processors, available sensor locations of the thermal hydraulic system, wherein: generating the second description includes generating the second description based on the available sensor locations.

14. The method of any one of aspects 1-13, wherein generating the second description includes generating the second description using a genetic algorithm.

15. The method of any one of aspects 1-14, wherein displaying the indication of the optimal sensor set includes displaying at least one of a description of the optimal sensor set or a score of the optimal sensor set.

16. A computer system for determining an optimal sensor set, the computing system comprising: one or more processors; and a non-transitory computer-readable medium storing thereon instructions that, when executed by the one or more processors, cause the computer system to: identify a set of possible faults of a thermal hydraulic system and a set of diagnostic objectives associated with the set of possible faults; obtain a plurality of descriptions of a respective plurality of sensor sets, wherein obtaining the plurality of descriptions includes: receiving a first description of a first sensor set of the plurality of sensor sets, and generating, based on the first description, a second description of a second sensor set of the plurality of sensor sets, wherein each description of the plurality of descriptions includes types of sensors of the respective sensor set of the plurality of sensor sets and locations of the sensors of the respective sensor set; for each particular sensor set of the plurality of sensor sets: determine, based on a particular description of the plurality of descriptions that corresponds to the particular sensor set, a diagnostic capability of the particular sensor set corresponding to diagnostic objectives of the set of diagnostic objectives that are met by the particular sensor set; and calculate a score of the particular sensor set based on the particular description and the diagnostic capability, wherein a score of a sensor set is increased by a monetary cost of the sensor set and decreased by the sensor set meeting a diagnostic objective of the set of diagnostic objectives; identify the optimal sensor set that has a lowest score of the plurality of sensor sets; and display an indication of the optimal sensor set.

17. The computer system of aspect 16, wherein the instructions further cause the one or more processors to: receive a system description of the thermal hydraulic system, the system description indicating: for each component of a plurality of components of the thermal hydraulic system, a type of the component and the location of the component in the thermal hydraulic system; and the connections between the plurality of components; wherein the instructions cause the computer system to determine the diagnostic capability of the particular sensor set by: constructing, based on physical conservation laws, the system description, and the particular description of the particular sensor set, a plurality of physics-based models corresponding to the plurality of components; generating residual expressions using analytical redundancy relations of the plurality of physics-based models; and determining the diagnostic capability of the particular sensor set based on the residual expressions.

18. The computer system of aspect 17, wherein the instructions cause the computer system to construct the physics-based models by: retrieving, based on the system description and the particular description of the particular sensor set, the physics-based models from a database including a plurality of generic-physics based models.

19. The computer system of aspect 17 or 18, wherein: each residual expression can evaluate to a zero residual or a non-zero residual; each fault of the set of possible faults corresponds to a combination of zero residuals and non-zero residuals; and the instructions cause the computer system to determine the diagnostic capability of the particular sensor set based on the residual expressions by: determining, for possible combinations of zero residuals of the residual expressions and non-zero residuals of the residual expressions, whether a corresponding fault of the set of possible faults can be diagnosed.

20. The computer system of any one of aspects 17-19, wherein the instructions case the computing system to: receive the system description by receiving a piping and instrumentation diagram (P&ID) of the thermal hydraulic system; receive the first description by extracting, from the P&ID, the first description; and the instructions further cause the computer system to: extract, from the P&ID, available sensor locations of the thermal hydraulic system; and generate the second description further based on the available sensor locations.

Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of exemplary functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computing system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for methods and systems for diagnosing faults and determining optimal sensor sets through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for determining an optimal sensor set, the method comprising:
   identifying, by one or more processors, a set of possible faults of a thermal hydraulic system and a set of diagnostic objectives associated with the set of possible faults;
   obtaining, by the one or more processors, a plurality of descriptions of a respective plurality of sensor sets, wherein obtaining the plurality of descriptions includes:
      receiving a piping and instrumentation diagram (P&ID) of the thermal hydraulic system,
      extracting, from the P&ID, a first description of a first sensor set of the plurality of sensor sets, and
      generating, based on the first description, a second description of a second sensor set of the plurality of sensor sets,
      wherein each description of the plurality of descriptions includes types of sensors of a respective sensor set of the plurality of sensor sets and locations of the sensors of the respective sensor set, and each description is different from other descriptions of the plurality of descriptions;
   for each particular sensor set of the plurality of sensor sets:
      determining, by the one or more processors, based on a particular description of the plurality of descriptions that corresponds to the particular sensor set, a diagnostic capability of the particular sensor set corresponding to a measure of how many diagnostic objectives of the set of diagnostic objectives are met by the particular sensor set; and
      calculating, by the one or more processors, a score of the particular sensor set based on the particular description and the diagnostic capability, wherein a score of a sensor set is increased by a monetary cost of the sensor set and decreased by the sensor set meeting a diagnostic objective of the set of diagnostic objectives;

identifying, by the one or more processors, the optimal sensor set that has a lowest score of the plurality of sensor sets; and displaying, by the one or more processors, an indication of the optimal sensor set.

2. The method of claim 1, wherein at least one diagnostic objective of the set of diagnostic objectives includes diagnosing a fault of the set of possible faults.

3. The method of claim 1, wherein at least one diagnostic objective of the set of diagnostic objectives includes uniquely diagnosing a fault of the set of possible faults.

4. The method of claim 1, wherein at least one diagnostic objective of the set of diagnostic objectives includes diagnosing a fault of the set of possible faults within a threshold distance.

5. The method of claim 1, wherein the monetary cost of the sensor set includes an installation cost of installing the sensor set.

6. The method of claim 1, wherein the monetary cost of the sensor set includes a maintenance cost of maintaining the sensor set.

7. The method of claim 1, further comprising:

receiving, at the one or more processors, a system description of the thermal hydraulic system, the system description indicating:

for each component of a plurality of components of the thermal hydraulic system, a type of the component and the location of the component in the thermal hydraulic system; and connections between the plurality of components;

wherein determining the diagnostic capability of the particular sensor set includes:

constructing, based on physical conservation laws, the system description, and the particular description of the particular sensor set, a plurality of physics-based models corresponding to the plurality of components;

generating residual expressions using analytical redundancy relations of the plurality of physics-based models; and determining the diagnostic capability of the particular sensor set based on the residual expressions.

8. The method of claim 7, wherein constructing the plurality of physics-based models includes retrieving, based on the system description and the particular description of the particular sensor set, the plurality of physics-based models from a database including a plurality of generic-physics based models.

9. The method of claim 7, wherein:

each residual expression can evaluate to a zero residual or a non-zero residual;

each fault of the set of possible faults corresponds to a combination of zero residuals and non-zero residuals; and determining the diagnostic capability of the particular sensor set based on the residual expressions includes:

determining, for possible combinations of zero residuals of the residual expressions and non-zero residuals of the residual expressions, whether a corresponding fault of the set of possible faults can be diagnosed.

10. The method of claim 9, wherein determining, for possible combination of zero residuals and non-zero residuals, whether the corresponding fault of the set of possible faults can be diagnosed includes determining whether a fault of the set of possible faults can be diagnosed within a predetermined probability threshold.

11. The method of claim 7, wherein receiving the system description includes receiving the P&ID of the thermal hydraulic system.

12. The method of claim 1, further comprising:

determining, by the one or more processors, available sensor locations of the thermal hydraulic system, wherein:

generating the second description includes generating the second description based on the available sensor locations.

13. The method of claim 1, wherein generating the second description includes generating the second description using a genetic algorithm.

14. The method of claim 1, wherein displaying the indication of the optimal sensor set includes displaying at least one of a description of the optimal sensor set or a score of the optimal sensor set.

15. A computer system for determining an optimal sensor set, the computer system comprising:

one or more processors; and a non-transitory computer-readable medium storing thereon instructions that, when executed by the one or more processors, cause the computer system to:

identify a set of possible faults of a thermal hydraulic system and a set of diagnostic objectives associated with the set of possible faults;

obtain a plurality of descriptions of a respective plurality of sensor sets, wherein obtaining the plurality of descriptions includes:

receiving a piping and instrumentation diagram (P&ID) of the thermal hydraulic system, extracting, from the P&ID, a first description of a first sensor set of the plurality of sensor sets, and generating, based on the first description, a second description of a second sensor set of the plurality of sensor sets, wherein each description of the plurality of descriptions includes types of sensors of a respective sensor set of the plurality of sensor sets and locations of the sensors of the respective sensor set, and each description is different from other descriptions of the plurality of descriptions;

for each particular sensor set of the plurality of sensor sets:

determine, based on a particular description of the plurality of descriptions that corresponds to the particular sensor set, a diagnostic capability of the particular sensor set corresponding to a measure of how many diagnostic objectives of the set of diagnostic objectives are met by the particular sensor set; and calculate a score of the particular sensor set based on the particular description and the diagnostic capability, wherein a score of a sensor set is increased by a monetary cost of the sensor set and decreased by the sensor set meeting a diagnostic objective of the set of diagnostic objectives;

identify the optimal sensor set that has a lowest score of the plurality of sensor sets; and display an indication of the optimal sensor set.

16. The computer system of claim 15, wherein the instructions further cause the one or more processors to:

receive a system description of the thermal hydraulic system, the system description indicating:

for each component of a plurality of components of the thermal hydraulic system, a type of the component and the location of the component in the thermal hydraulic system; and connections between the plurality of components;

wherein the instructions cause the computer system to determine the diagnostic capability of the particular sensor set by:

constructing, based on physical conservation laws, the system description, and the particular description of the particular sensor set, a plurality of physics-based models corresponding to the plurality of components;

generating residual expressions using analytical redundancy relations of the plurality of physics-based models; and determining the diagnostic capability of the particular sensor set based on the residual expressions.

17. The computer system of claim 16, wherein the instructions cause the computer system to construct the plurality of physics-based models by:

retrieving, based on the system description and the particular description of the particular sensor set, the plurality of physics-based models from a database including a plurality of generic-physics based models.

18. The computer system of claim 16, wherein:

each residual expression can evaluate to a zero residual or a non-zero residual;

each fault of the set of possible faults corresponds to a combination of zero residuals and non-zero residuals; and the instructions cause the computer system to determine the diagnostic capability of the particular sensor set based on the residual expressions by:

determining, for possible combinations of zero residuals of the residual expressions and non-zero residuals of the residual expressions, whether a corresponding fault of the set of possible faults can be diagnosed.

19. The computer system of claim 16, wherein the instructions cause the computer system to:

receive the system description by receiving the P&ID of the thermal hydraulic system; and the instructions further cause the computer system to:

extract, from the P&ID, available sensor locations of the thermal hydraulic system; and generate the second description further based on the available sensor locations.

* * * * *